(12) United States Patent
Mori

(10) Patent No.: US 8,475,278 B2
(45) Date of Patent: Jul. 2, 2013

(54) TERMINAL DEVICE, GAME CONTROL METHOD, INFORMATION RECORDING MEDIUM, AND PROGRAM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 283 days.

(21) Appl. No.: 12/747,871

(22) PCT Filed: Dec. 5, 2008

(86) PCT No.: PCT/JP2008/072200
§ 371 (c)(1),
(2), (4) Date: Jul. 2, 2010

(87) PCT Pub. No.: WO2009/075239
PCT Pub. Date: Jun. 18, 2009

(65) Prior Publication Data
US 2012/0142422 A1 Jun. 7, 2012

(30) Foreign Application Priority Data
Dec. 11, 2007 (JP) ................... 2007-319243

(51) Int. Cl.
*A63F 13/12* (2006.01)
(52) U.S. Cl.
USPC .......................................................... 463/42
(58) Field of Classification Search
USPC ............................................................ 463/42
See application file for complete search history.

(56) References Cited

U.S. PATENT DOCUMENTS 5,561,769 A * 10/1996 Kumar et al. ................. 709/202
5,838,909 A * 11/1998 Roy et al. ..................... 709/209
(Continued)

FOREIGN PATENT DOCUMENTS

JP    2000-197773 A    7/2000
JP    2001-149658 A    6/2001
(Continued)

OTHER PUBLICATIONS

Taiwanese Office Action with English Translation (Issued Dec. 27, 2011).

(Continued)

*Primary Examiner* — Dmitry Suhol
*Assistant Examiner* — Jay Trent Liddle
(74) *Attorney, Agent, or Firm* — Howard & Howard Attorneys PLLC

(57) ABSTRACT

In a network match game such as a ball game, to naturally reflect an intension of a user such as a player in the operation of an operation object such as a character, a storage unit (501) of a terminal device (401) stores positions and velocities of a mobile body and each control object; on the basis of instruction input received by an instruction input reception unit (502), a local position updating unit (503) updates a position and a velocity of a control object assigned to the terminal device (401); in a terminal device (401) in a parent device mode, a parent mobile body updating unit (509) updates the position and the velocity of the mobile body, whereas in a terminal device (401) in a child mode, a child mobile body updating unit (511) updates the position and the velocity of the mobile body on the basis of information transmitted from the parent device; and a parent transfer unit (507) estimates a control object that is to collide with the mobile body, and sets a mode of a terminal device (401) assigned to the estimated control object to correspond to the parent device.

14 Claims, 7 Drawing Sheets

U.S. PATENT DOCUMENTS

| | | | |
|---|---|---|---|
| 6,363,416 B1* | 3/2002 | Naeimi et al. | 709/209 |
| 6,383,075 B1* | 5/2002 | Jeong et al. | 463/39 |
| 7,854,657 B2* | 12/2010 | Shiraiwa | 463/42 |
| 7,967,671 B2* | 6/2011 | Kouno et al. | 463/12 |
| 2006/0247059 A1* | 11/2006 | Nogami et al. | 463/42 |
| 2006/0252548 A1* | 11/2006 | Sasaki et al. | 463/42 |
| 2007/0238529 A1* | 10/2007 | Iwamoto et al. | 463/42 |
| 2011/0263332 A1* | 10/2011 | Mizrachi | 463/42 |

FOREIGN PATENT DOCUMENTS

| | | |
|---|---|---|
| JP | 2003-190835 A | 7/2003 |
| JP | 2004-220273 A | 8/2004 |
| JP | 2004-321598 A | 11/2004 |
| JP | 2007-117341 A | 5/2007 |
| TW | 200722155 A | 6/2007 |
| TW | 200735940 A | 10/2007 |
| TW | 200735941 A | 10/2007 |

OTHER PUBLICATIONS

International Search Report for Patent Application No. PCT/JP2008/072200 mailed Feb. 17, 2009, 4 pages.

• Konami Kanpeki Koryaku Series 5, "J League Jikkyo Winning Eleven '97", Koshiki Kanzen Guide Book, Konami Co. Ltd., Jul. 5, 1997, p. 14.

* cited by examiner

TERMINAL DEVICE, GAME CONTROL METHOD, INFORMATION RECORDING MEDIUM, AND PROGRAM

TECHNICAL FIELD

This application relates generally to a terminal device and a game control method that are preferable for, in a network match game such as a ball game, more naturally reflecting an intension of a user such as a player in the operation of an operation object such as a character, a computer-readable information recording medium that records a program for realizing them on a computer, and the program.

BACKGROUND ART

There has conventionally been proposed a technique that, in a network communication game, with a plurality of terminal devices communicating with one another, makes any one of the terminal devices function as a so-called "server" and the others function as "clients" to advance the game. A technique related to such a game is disclosed in Patent Literatures 1 and 2, which are listed below.

In a technique disclosed in Paragraph [0037] and [0038] of Description of Patent Literature 1, one of terminal devices to be competed is allotted to a main terminal, and depending on whether the main terminal or not, a process related to advancement of a game is made different.

Also, Patent Literature 2 discloses a technique for simulating the collision of objects in a virtual space, which can be applied to situations such as hitting back a ball with a bat or racket.

Meanwhile, in general, not only in a network communication game, but in a various types of games, there is used a method in which, under the condition that one of players is assigned to a "parent", and the other players are assigned to "children", tasks performed by the "parent" and the "children" are made different.

Accordingly, even in a match in the network communication game, there is widely used a method in which operation input by a player is transmitted from a "child" terminal device to a "parent" terminal device to make the terminal device corresponding to a "parent" determine contact between a ball and the player (in a baseball game or the like, success/failure, or the like, of a series of operations, for example, the ball is released from a pitcher's hand, a batter's bat hits the ball, a fielding side gets the ball with a glove and then throws the ball, the fielding side catches the ball to touch a runner, and other operations; in tennis, table tennis, air hockey, or the like, success/failure of a series of operations of contact between a racket and the ball and hitting back of the ball, calculation of movement of the ball, and other operation), or perform other operation.

On the other hand, in order to make a match equal, there is used a method in which all players sequentially rotate a "parent". For example, in a baseball game or the like, offense and defense are switched to each other in the top or bottom of each inning, and in tennis, table tennis, air hockey, or the like, a player to provide a service is switched according to a rule. For this reason, even in the network communication game, there is used a method in which a "parent" is rotated to thereby maintain equality.

Patent Literature 1: Unexamined Japanese Patent Application KOKAI Publication No. 2003-190635
Patent Literature 2: Japanese Patent No. 3542795

DISCLOSURE OF INVENTION

Problem to be Solved by the Invention

However, in the conventional method, there arises a problem that operation input by a player serving as a "parent" is likely to be immediately reflected in a game, whereas operation input by a player serving as a "child" is likely to give rise to a delay until the operation input is reflected in the game. Accordingly, there is a big desire to appropriately reflect operation input by a player in a game.

On the other hand, in order to fairly play a game, between players, an "equal match" should be maintained as much as possible.

The present invention is one that solves the above-described problem, and has an object to provide a terminal device and a game control method that are preferable for, in a network match game such as a ball game, more naturally reflecting an intension of a user such as a player in the operation of an operation object such as a character, a computer-readable information recording medium that records a program for realizing them on a computer, and the program.

Means to Solve the Problem

In order to accomplish the above object, the following inventions are disclosed according to a principle of invention.

A terminal device according to a first aspect of the present invention is any of a plurality of mutually communicable terminal devices possessed by a game system that moves a plurality of operation objects and one mobile body in a virtual space, and provided with: a storage unit; an instruction input reception unit; a local position updating unit; a local position transmission unit; an other position reception unit; an other position updating unit; a parent transfer unit; a unit serving as parent; a parent mobile body updating unit; a mobile body position transmission unit; a mobile body position reception unit; and a child mobile body updating unit, which are configured as follows.

That is, the storage unit stores respective positions and respective velocities of the plurality of operation objects, and a position and a velocity of the mobile body, and stores whether a mode of the terminal device corresponds to a parent device or a child device.

For example, in a baseball game, the operation objects are typically set as characters such as a batter and a runner on an offense side, and a pitcher, catcher, and fielders on a defense side. In a tennis game or air hockey game, two characters may be set as the operation objects, or tools such as rackets may be set as the operation objects.

Also, a ball in baseball, or a ball in tennis corresponds to the mobile body. Whether the parent device or child device is determined not by a game rule such as whether a top or bottom of an inning, or whether a service side or nor, but on the basis of information stored in the storage unit as will be described later.

On the other hand, the instruction input reception unit receives instruction input from a user assigned to the terminal device.

In the baseball game, a height to which a pitcher raises his/her hand, timing at which the pitcher releases a ball, timing at which a batter swings a bat, selection indicating which base a fielder throws a caught ball to, or the like is determined by the instruction input, whereas in the tennis or air hockey game, which site to which the operation object such as a racket is moved, which timing at which the operation object is moved, or the like is transferred to the terminal device by the instruction input.

Further, the local position updating unit updates in the storage unit, on the basis of the received instruction input, a position where an operation object assigned to the user is arranged and a velocity of the operation object among the plurality of operation objects.

For example, in the baseball game, two players operate operation objects belonging to respective teams. Accordingly, one of the players (users) is assigned with the operation objects as batters and runners, whereas the other player (user) is assigned with the operation objects as a pitcher, catcher, and fielders. Also, in the tennis game or air hockey game, two players are respectively assigned with the operation objects to play a match.

As described, when the instruction input by a player using a terminal device is provided, a position and a velocity of an operation object operated by the player are immediately reflected in the terminal device. Accordingly, the player is very unlikely to feel delay relative to his/her operation.

On the other hand, the local position transmission unit transmits the updated position and the updated velocity of the operation object assigned to the user to other terminal devices among the plurality of terminal devices; the other position reception unit receives positions and velocities of operation objects assigned to other users, the positions and the velocities being transmitted from the other terminal devices among the plurality of terminal devices; and the other position updating unit updates in the storage unit the received positions and the received velocities of the operation objects assigned to the other users. This is because a result of an operation by a player in his/her terminal device is notified to the other terminal devices, and results of operations by players in the other terminal devices are reflected in his/her terminal device to advance a game.

As described, in the present invention, when instruction inputs provided in the other terminal device by the other players are reflected in the game, communication delay may occur. However, even if such delay occurs, positions and velocities of operation objects that the player him-/herself cannot operate in the first place are updated, and therefore it can be envisaged that a degree to which the player feels unnaturalness is low.

Further, the parent transfer unit estimates, in the case where the mode of the terminal device corresponds to the parent device, from the respective positions and the respective velocities of the plurality of operation objects, and the position and the velocity of the mobile body, an operation object to come into contact with the mobile body, and if a terminal device assigned with a user assigned with the estimated operation object is another terminal device, updates the mode of the terminal device to a mode corresponding to the child device in the storage unit to notify the another terminal device that the another terminal device should serve as the parent device.

In the baseball game, tennis game, air hockey game, or the like as described above, an operation object comes into contact with a ball to change a moving direction of the ball, and thereby the game advances. Accordingly, it can be thought that a situation where each player operates his/her operation object with taking great care is one where a mobile body and the operation object are coming close to each other. For example, while a ball is coming close to a batter, timing at which a batter swings a bat is determined, or while a ball is coming close to one's own field, a position of a racket is determined, or other situation.

Accordingly, in the present invention, an operation object to which the mobile body (ball) is to come into contact in terms of time is estimated; a terminal device of a player operating the operation object is made to serve as the "parent", while the other terminal devices are made to serve as "children"; and as will be described later, the update of the position and velocity of the mobile body is imposed on the "parent".

Also, in the case where the mode of the terminal device corresponds to the child device, if the terminal device is notified from any of the other terminal devices that the terminal device should serve as the parent device, the unit serving as parent updates the mode of the terminal device to the mode corresponding to the parent device in the storage unit.

Accordingly, based on the notification between the parent transfer unit and the unit serving as parent, the terminal device serving as the "parent" is limited to one terminal device used by a player operating an operation object to which the mobile body is expected to come into contact soon, and the other terminal devices becomes the "children".

On the other hand, in the case where the mode of the terminal device corresponds to the parent device, the parent mobile body updating unit determines, from the respective positions and the respective velocities of the plurality of operation objects, and the position and the velocity of the mobile body, whether or not the mobile body comes into contact with the plurality of operation objects, and on the basis of a result of the determination, updates the position and the velocity of the mobile body in the storage unit.

As described, in the game such as a ball game, if an operation on an operation object present in the vicinity of a ball is immediately reflected, a player will feel advancement of the game to be stress-free and more natural. In the present invention, this is realized in such a manner that the "parent a terminal device in which an operation on an operation object expected to come into contact with the mobile body (ball) soon is performed is made to serve as the "parent", and the "parent" makes a collision determination of the mobile body (ball) and updates a position and velocity. Note that, for the "collision determination", there are various possible situations where some sort of change is made to movement of the ball, such as, in addition to a situation where a racket and a ball collide with each other, situations where a bat hit a ball back, and a glove catches a ball.

Further, in the case where the mode of the terminal device corresponds to the parent device, the mobile body position transmission unit transmits the updated position and the updated velocity of the mobile body to the other terminal devices among the plurality of terminal devices; in the case where the mode of the terminal device corresponds to the child device, the mobile body position reception unit receives the position and the velocity of the mobile body, the position and the velocity being transmitted from, among the plurality of terminal devices, a terminal device having the mode corresponding to the parent device; and the child mobile body updating unit updates in the storage unit the received position and the received velocity of the mobile body.

As described above, by reflecting, in the "child" terminal devices, information on the mobile body (ball) of which a movement situation is updated by the "parent" terminal device, the game is advanced.

According to the present invention, an operation of a player him-/herself is immediately reflected in his/her own operation object, and if the mobile body such as a ball and his/her own operation object are about to come into contact with each other to change a position and velocity of the mobile body, a calculation of a collision determination of the mobile body is made in his/her own terminal device, so that an operation on the mobile body through the operation object can be quickly reflected, and therefore an intension of the player is more naturally reflected in the operation object and the game.

Also, in the terminal device of the present invention, the local position transmission unit can be configured to make the terminal device having the mode corresponding to the parent device among the plurality of terminal devices serve as a relay to transmit the position and the velocity of the operation object to the other terminal devices; and the other position reception unit can be configured to make the terminal device having the mode corresponding to the parent device among the plurality of terminal devices serve as a relay to receive the positions and velocities of the operation objects assigned to the other users, the positions and the velocities being transmitted from the other terminal devices.

The present invention assumes the case of three or more terminal devices, and employs a method in which pieces of information on positions and velocities of respective operation objects are once collected in the parent device, and then distributed to the child devices.

In addition, it is thought that, if the "distribution of the pieces of information on positions and velocities of respective operation objects" and the "notification of a terminal device to serve as the parent device next" are simultaneously performed (through one communication unit), a possibility of giving rise to a contradiction among positions/velocities/modes stored in terminal devices becomes lower.

In the child device, it is preferable that, with respect to the operation objects other than the operation object assigned to the player using the terminal device, the received positions and velocities are reflected in the storage unit. This is because, as described above, with respect to the operation object assigned to the player using the terminal device, the storage unit is updated without communication delay relative to the operation input.

According to the present invention, in the case of three or more terminal devices, mutual communication can be smoothly performed, and a possibility of giving rise to a contradiction between mutually stored pieces of information can be reduced as much as possible.

A terminal device according to another aspect of the present invention is any of a plurality of mutually communicable terminal devices possessed by a game system that moves a plurality of operation objects and one or more mobile bodies in a virtual space, and provided with: a storage unit; an instruction input reception unit; a local position updating unit; a local position transmission unit; an other position reception unit; an other position updating unit; a parent transfer unit; a unit serving as parent; a parent mobile body updating unit; a mobile body position transmission unit; a mobile body position reception unit; and a child mobile body updating unit, which are configured as follows.

That is, the storage unit stores respective positions and respective velocities of the plurality of operation objects, and respective positions and respective velocities of the one or more mobile bodies, and stores whether or not the terminal device controls each of the one or more mobile bodies.

On the other hand, the instruction input reception unit receives instruction input from a user assigned to the terminal device.

Further, the local position updating unit updates in the storage unit, on the basis of the received instruction input, a position where an operation object assigned to the user is arranged and a velocity of the operation object among the plurality of operation objects.

Still further, the local position transmission unit transmits the updated position and the updated velocity of the operation object assigned to the user to other terminal devices among the plurality of terminal devices.

On the other hand, the other position reception unit receives positions and velocities of operation objects assigned to other users, the positions and the velocities being transmitted from the other terminal devices among the plurality of terminal devices.

Further, the other position updating unit updates in the storage unit the received positions and the received velocities of the operation objects assigned to the other users.

Also, for each of mobile bodies controlled by the terminal device among the one or more mobile bodies, the parent transfer unit estimates an operation object to come into contact with the mobile body from the respective positions and the respective velocities of the plurality of operation objects, and a position and a velocity of the mobile body, and if a terminal device assigned with a user assigned with the estimated operation object is another terminal device, makes an update in the storage unit such that the terminal device does not control the mobile body, and notifies the another terminal device that the another terminal device should control the mobile body.

On the other hand, if the terminal device is notified from any of the other terminal devices among the plurality of terminal devices that the terminal device should control some mobile body, the unit serving as parent makes an update in the storage unit such that the terminal device controls the mobile body.

Further, for each of the mobile bodies controlled by the terminal device among the one or more mobile bodies, the parent mobile body updating unit determines whether or not the mobile body comes into contact with the plurality of operation objects or other mobile bodies among the one or more mobile bodies, from the respective positions and the respective velocities of the plurality of operation objects, and a position and a velocity of the mobile body, and on the basis of a result of the determination, updates the position and the velocity of the mobile body in the storage unit.

Also, for each of the mobile bodies controlled by the terminal device among the one or more mobile bodies, the mobile body position transmission unit transmits the updated position and the updated velocity of the mobile body to the other terminal devices among the plurality of terminal devices.

On the other hand, the mobile body position reception unit receives a position and a velocity of some mobile body, the position and the velocity being transmitted from any of the other terminal devices among the plurality of terminal devices.

Further, the child mobile body updating unit updates in the storage unit the received position and the received velocity of the mobile body.

Considering the above invention more generally, it can be thought that the "parent device" is a terminal device controlling some mobile body, and the "child device" is a terminal device not controlling the mobile body. Accordingly, as will be described later, in the case of presence of a plurality of mobile bodies, to apply a principle of the present invention, it is only necessary to take into account the "parent device" or the "child device" for each of the mobile bodies.

For this reason, in the present invention, it is defined that the "parent device" and the "child device" respectively means a "terminal device controlling some mobile body" and a "terminal device leaving the control of some mobile body to another terminal device", and whether the terminal device is the "parent" or the "child" is taken into account for each of the mobile bodies.

According to the present invention, even in a game using a plurality of mobile bodies such as a snowball fight game, a game in which a plurality of rubber balls are mutually thrown, and a ball toss game, the same effect as that of the above invention can be obtained.

Also, in the terminal device of the present invention, as a method for estimating an operation object to come into contact with the mobile body, the parent transfer unit can employ preferred embodiments as follows:

(a) For each of the plurality of operation objects, the parent transfer unit obtains a current distance between the operation object and the mobile body, and estimates that an operation object having a shortest current distance is an operation object to come into contact with the mobile body.

(b) For each of the plurality of operation objects, the parent transfer unit obtains a future distance between the operation object and the mobile body, the future distance being based on an assumption that the operation object and the mobile body move for a predetermined period of time with keeping the stored positions and the stored velocities, and estimates that an operation object having a shortest future distance is an operation object to come into contact with the mobile body.

(c) For each of the plurality of operation objects, the parent transfer unit obtains a current distance between the operation object and the mobile body, and a future distance between the operation object and the mobile body, the future distance being based on an assumption that the operation object and the mobile body move for a predetermined period of time with keeping the stored positions and the stored velocities, and estimates that an operation object having a distance that is obtained to be shortest among the current distances and the future distances is an operation object to come into contact with the mobile body.

(d) For each of the plurality of operation objects, the parent transfer unit obtains a current distance between the operation object and the mobile body, and a future distance between the operation object and the mobile body, the future distance being based on an assumption that the operation object and the mobile body move for a predetermined period of time with keeping the stored positions and the stored velocities, and estimates that, among operation objects each having a future distance smaller than a current distance, an operation object having a shortest future distance is an operation object to come into contact with the mobile body.

(e) Each of the plurality of operation objects is preliminarily assigned with any of a plurality of regions into which the virtual space is divided so as to avoid overlapping; the local position updating unit makes an update such that the position of the operation object assigned to the user is included in a region preliminarily assigned to the operation object; and the parent transfer unit estimates that an operation object assigned to a region including the position of the mobile body among the plurality of regions is an operation object to come into contact with the mobile body.

The above embodiments respectively represent various aspects of the method for estimating an operation object that is expected to come into contact with a mobile body soon in terms of time in the present invention, and depending on the type, difficulty, or the like of a game, or intended use, an appropriate method can be appropriately selected.

Also, in the terminal device of the present invention, the instruction input to be received includes instruction input that selects an operation to be performed on the mobile body when, among the plurality of operation objects, the operation object assigned to the user comes close to the mobile body; and the parent mobile body updating unit can be configured to update, if the received instruction input includes the instruction input that selects the operation, the position and the velocity of the mobile body according to the operation.

For example, baseball games include one in which, when a character (operation object) serving as a pitcher is close to a ball (mobile body), a command specifying a direction in which the ball is to be thrown, or a variation given to a moving trajectory of the ball such as a breaking ball or screw ball can be inputted, or a command specifying the conditions of a height of the ball (mobile body) relative to a character (operation object) serving as a batter, timing, and strength under which the character swings a bat can be inputted. Also, many of the games are configured such that such commands can be inputted in advance before the ball comes close to the character.

The present invention is one that deals with such commands, and calculates the moving appearance of a mobile body not only by a physical simulation but also by a command inputted by a player.

According to the present invention, when an operation object is close to or expected to be close to a mobile body, an operation giving a variation to movement of the mobile body can be performed by a player.

Also, in the terminal device of the present invention, after the parent mobile body updating unit has updated the position and the velocity of the mobile body according to the operation, if the operation is an operation in which the mobile body is assumed to move away from the operation object assigned to the user, instead of estimating, from all of the plurality of operation objects, an operation object to come into contact with the mobile body, the parent transfer unit can be configured to estimate, from operation objects not assigned to any user among the plurality of operation objects, an operation object to come into contact with the mobile body.

For example, in the baseball game, it can be thought that a command for "hitting a ball" is executed, and after the character serving as a batter has swung the bat, a transfer to a phase in which not a offense side team but a defense side team handles the ball is immediately made.

For this reason, in the present invention, depending the type of an operation, when an operation object (expected) to come into contact is estimated, a search range for the estimation is limited to characters not on a side of a player having performed the operation.

According to the present invention, depending on a game rule applied, a transfer of the parent can be more smoothly made.

A game control method according to still another aspect of the present invention is a game control method performed by each of a plurality of mutually communicable terminal devices possessed by a game system that moves a plurality of operation objects and one mobile body in a virtual space, wherein each of the plurality of terminal devices has: a storage unit; an instruction input reception unit; a local position updating unit; a local position transmission unit; an other position reception unit; an other position updating unit; a parent transfer unit; a unit serving as parent; a parent mobile body updating unit; a mobile body position transmission unit; a mobile body position reception unit; and a child mobile body updating unit.

In the method, the storage unit stores respective positions and respective velocities of the plurality of operation objects, and a position and a velocity of the mobile body, and stores whether a mode of the terminal device corresponds to a parent device or a child device.

Also, the game control method of the present invention comprises: an instruction input reception step; a local position updating step; a local position transmission step; an other position reception step; an other position updating step; a parent transfer step; a serving-as-parent step; a parent mobile body updating step; a mobile body position transmission step; a mobile body position reception step; and a child mobile body updating step, which are configured as follows:

That is, in the instruction input reception step, the instruction input reception unit receives instruction input from a user assigned to the terminal device.

On the other hand, in the local position updating step, the local position updating unit updates in the storage unit, on the basis of the received instruction input, a position where an operation object assigned to the user is arranged and a velocity of the operation object among the plurality of operation objects.

Further, in the local position transmission step, the local position transmission unit transmits the updated position and the updated velocity of the operation object assigned to the user to other terminal devices among the plurality of terminal devices.

Still further, in the other position reception step, the other position reception unit receives positions and velocities of operation objects assigned to other users, the positions and the velocities being transmitted from the other terminal devices among the plurality of terminal devices.

On the other hand, in the other position updating step, the other position updating unit updates in the storage unit the received positions and the received velocities of the operation objects assigned to the other users.

Further, in the parent transfer step, in the case where the mode of the terminal device corresponds to the parent device, from the respective positions and the respective velocities of the plurality of operation objects, and the position and the velocity of the mobile body, the parent transfer unit estimates an operation object to come into contact with the mobile body, and if a terminal device assigned with a user assigned with the estimated operation object is another terminal device, updates the mode of the terminal device to a mode corresponding to the child device in the storage unit to notify the another terminal device that the another terminal device should serve as the parent device.

Also, in the serving-as-parent step, in the case where the mode of the terminal device corresponds to the child device, if the terminal device is notified from any of the other terminal devices that the terminal device should serve as the parent device, the unit serving as parent updates the mode of the terminal device to the mode corresponding to the parent device in the storage unit.

On the other hand, in the parent mobile body updating step, in the case where the mode of the terminal device corresponds to the parent device, from the respective positions and the respective velocities of the plurality of operation objects, and the position and the velocity of the mobile body, the parent mobile body updating unit determines whether or not the mobile body comes into contact with the plurality of operation objects, and on the basis of a result of the determination, updates the position and the velocity of the mobile body in the storage unit.

Further, in the mobile body position transmission step, in the case where the mode of the terminal device corresponds to the parent device, the mobile body position transmission unit transmits the updated position and the updated velocity of the mobile body to the other terminal devices among the plurality of terminal devices.

Also, in the mobile body position reception step, in the case where the mode of the terminal device corresponds to the child device, the mobile body position reception unit receives the position and the velocity of the mobile body, the position and the velocity being transmitted from, among the plurality of terminal devices, a terminal device having the mode corresponding to the parent device.

On the other hand, in the child mobile body updating step, the child mobile body updating unit updates in the storage unit the received position and the received velocity of the mobile body.

A game control method according to yet another aspect of the present invention is a game control method performed by each of a plurality of mutually communicable terminal devices possessed by a game system that moves a plurality of operation objects and one or more mobile bodies in a virtual space, wherein each of the plurality of terminal devices has: a storage unit; an instruction input reception unit; a local position updating unit; a local position transmission unit; an other position reception unit; an other position updating unit; a parent transfer unit; a unit serving as parent; a parent mobile body updating unit; a mobile body position transmission unit; a mobile body position reception unit; and a child mobile body updating unit.

In the method, the storage unit stores respective positions and respective velocities of the plurality of operation objects, and respective positions and respective velocities of the one or more mobile bodies, and stores whether or not the terminal device controls each of the one or more mobile bodies.

Also, the game control method of the present invention comprises: an instruction input reception step; a local position updating step; a local position transmission step; an other position reception step; an other position updating step; a parent transfer step; a serving-as-parent step; a parent mobile body updating step; a mobile body position transmission step; a mobile body position reception step; and a child mobile body updating step, which are configured as follows:

That is, in the instruction input reception step, the instruction input reception unit receives instruction input from a user assigned to the terminal device.

On the other hand, in the local position updating step, the local position updating unit updates in the storage unit, on the basis of the received instruction input, a position where an operation object assigned to the user is arranged and a velocity of the operation object among the plurality of operation objects.

Further, in the local position transmission step, the local position transmission unit transmits the updated position and the updated velocity of the operation object assigned to the user to other terminal devices among the plurality of terminal devices.

Still further, in the other position reception step, the other position reception unit receives positions and velocities of operation objects assigned to other users, the positions and the velocities being transmitted from the other terminal devices among the plurality of terminal devices.

On the other hand, in the other position updating step, the other position updating unit updates in the storage unit the received positions and the received velocities of the operation objects assigned to the other users.

Further, in the parent transfer step, for each of mobile bodies controlled by the terminal device among the one or more mobile bodies, the parent transfer unit estimates an operation object to come into contact with the mobile body from the respective positions and the respective velocities of the plurality of operation objects, and a position and a velocity of the mobile body, and if a terminal device assigned with a user assigned with the estimated operation object is another terminal device, makes an update in the storage unit such that the terminal device does not control the mobile body, and notifies the another terminal device that the another terminal device should control the mobile body.

Also, in the serving-as-parent step, if the terminal device is notified from any of the other terminal devices among the plurality of terminal devices that the terminal device should control some mobile body, the unit serving as parent makes an update in the storage unit such that the terminal device controls the mobile body.

On the other hand, in the parent mobile body updating step, for each of the mobile bodies controlled by the terminal device among the one or more mobile bodies, the parent mobile body updating unit determines whether or not the mobile body comes into contact with the plurality of operation objects or other mobile bodies among the one or more mobile bodies, from the respective positions and the respective velocities of the plurality of operation objects, and a position and a velocity of the mobile body, and on the basis of a result of the determination, updates the position and the velocity of the mobile body in the storage unit.

Further, in the mobile body position transmission step, if a mode of the terminal device corresponds to a parent device, the mobile body position transmission unit transmits the updated position and the updated velocity of the mobile body to the other terminal devices among the plurality of terminal devices.

Also, in the mobile body position reception step, the mobile body position reception unit receives a position and a velocity of some mobile body, the position and the velocity being transmitted from any of the other terminal devices among the plurality of terminal devices.

On the other hand, in the child mobile body updating step, the child mobile body updating unit updates in the storage unit the received position and the received velocity of the mobile body.

A program according to further aspect of the present invention is configured to instruct a computer to function as the respective units of the above-described terminal device, and instruct the computer to perform the respective steps of the above-described game control method.

Also, the program of the present invention can be recorded in a computer-readable information recording medium such as a compact disk, flexible disk, hard disk, magneto-optical disk, digital video disk, magnetic tape, or semiconductor memory.

The above-described program can be distributed/sold through a computer communication network, independently of a computer executing the program. Also, the above-described information recording medium can be distributed/sold, independently of a computer.

Effect of the Invention

According to the present invention, there can be provided a terminal device and a game control method that are preferable for, in a network match game such as a ball game, more naturally reflecting an intension of a user such as a player in the operation of an operation object such as a character, a computer-readable information recording medium that records a program for realizing them on a computer, and the program.

EXPLANATION OF REFERENCE NUMERALS

100: Information processor;
101: CPU;
102: ROM;
103: RAM;
104: Interface;
105: Controller;
106: External memory;
107: Image processing unit;
108: DVD-ROM drive;
109: NIC;
110: Sound processing unit;
111: Microphone;
201: ↑ button;
202: ↓ button;
203: ← button;
204: → button;
205: ○ button;
206: X button;
207: Δ button;
208: □ button;
209: SELECT button;
210: START button;
211: ANALOG button;
212: Indicator;
213: Joystick;
214: Joystick;
215: L1 button;
216: L2 button;
217: R1 button;
218: R2 button;
301: Screen;
302: Court;
303: Racket;
304: Ball;
305: Wall;
401: Terminal device;
402: Computer communication network;
403: Lobby server;
501: Storage unit;
502: Instruction input reception unit;
503: Local position updating unit;
504: Local position transmission unit;
505: Other position reception unit;

506: Other position updating unit;
507: Parent transfer unit;
508: Unit serving as parent;
509: Parent mobile body updating unit;
510: Mobile body position transmission unit;
511: Child mobile body updating unit;
512: Mobile body position reception unit;
701: Mobile body;
702: Operation object; and
703: Operation object

BEST MODE FOR CARRYING OUT THE INVENTION

Embodiments of the present invention will hereinafter be described. In the following, to facilitate understanding, the embodiments in which information processor for game is used to realize the present invention are described; however, the embodiments described below are only for descriptive purpose, but do not limit the scope of the present invention. Therefore, one having ordinary skill in the art can employ an embodiment in which respective or all components of any of the embodiments are replaced by equivalent ones; however, such an embodiment is included within the scope of the present invention.

Embodiment 1

Figure 1:
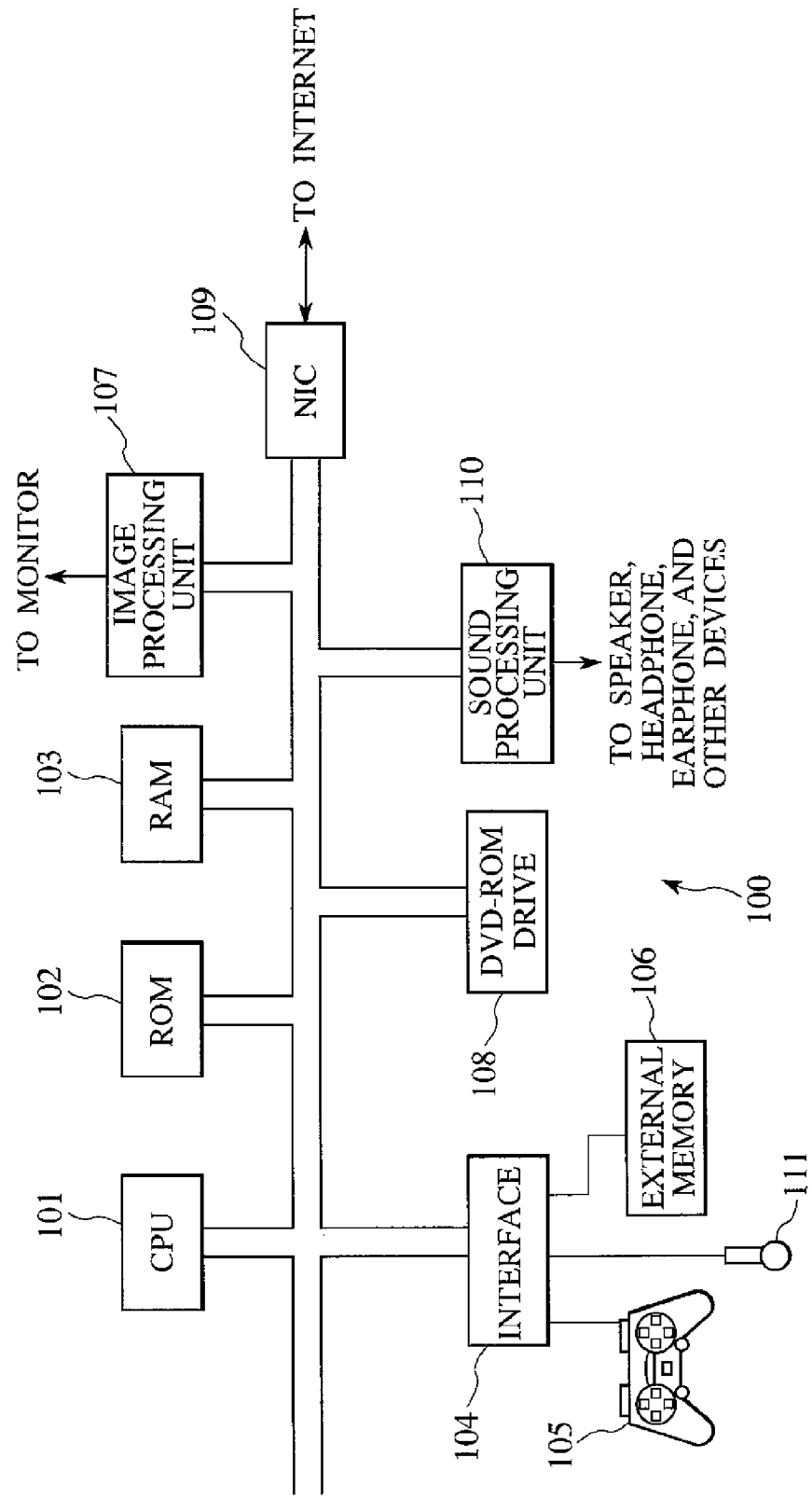
[FIG. 1] A schematic diagram illustrating an outline configuration of a typical information processor that functions as a terminal device or the like of the present invention by executing a program.

FIG. 1 is a schematic diagram illustrating an outline configuration of a typical information processor that functions as a terminal device and the like of the present invention by executing a program. In the following, the diagram is referenced to provide a description.

The information processor 100 is provided with a CPU (Central Processing Unit) 101, ROM 102, RAM (Random Access Memory) 103, interface 104, controller 105, external memory 106, image processing unit 107, DVD-ROM (Digital Versatile Disc ROM) drive 108, NIC (Network Interface Card) 109; sound processing unit 110, and microphone 111.

By loading a DVD-ROM storing a program and data for game in the DVD-ROM 108, and powering on the information processor 100, the program is executed to realize the terminal device and the like of the present embodiment.

The CPU 101 controls the entire operation of the information processor 100, and is connected to the respective components to communicate a control signal and data with them. Also, the CPU 101 can use an ALU (Arithmetic Logic Unit) (not illustrated) for a high speed accessible storage area called a register (not illustrated) to perform calculations including: arithmetic calculations such as addition, subtraction, multiplication and division; logic operations such as logical sum, logical product, and logical negation; bit calculations such as bitwise OR, bitwise AND, bit inversion, bit shift, and bit rotations, and other calculations. Further, to enable vector calculations at high speed, such as saturate calculations including addition, subtraction, multiplication and division for multimedia processing, and trigonometric function calculations, the CPU 101 itself is configured, or realized with a coprocessor.

The ROM 102 records an IPL (Initial Program Loader) that is executed immediately after the power on, and by executing the IPL, the program recorded in the DVD-ROM is read into the RAM 103, where the execution of the program is started by the CPU 101. Also, the ROM 102 records an operating system program and various pieces of data that are necessary to control the entire operation of the information processor 100.

The RAM 103 is intended to temporarily store data or program, and retains the program or data read from the DVD-ROM, or additionally data necessary for advancement of a game or chat communication. Also, the CPU 101 provides a variable area in the RAM 103, and performs processing of, for example, directly acting the ALU on a value stored in the variable area to perform a calculation, or once storing a value stored in the RAM 103 in the register to perform a calculation, and writing back a result of the calculation to a memory.

The controller 105 connected through the interface 104 receives operation input that a user performs when he/she plays the game.

Figure 2:
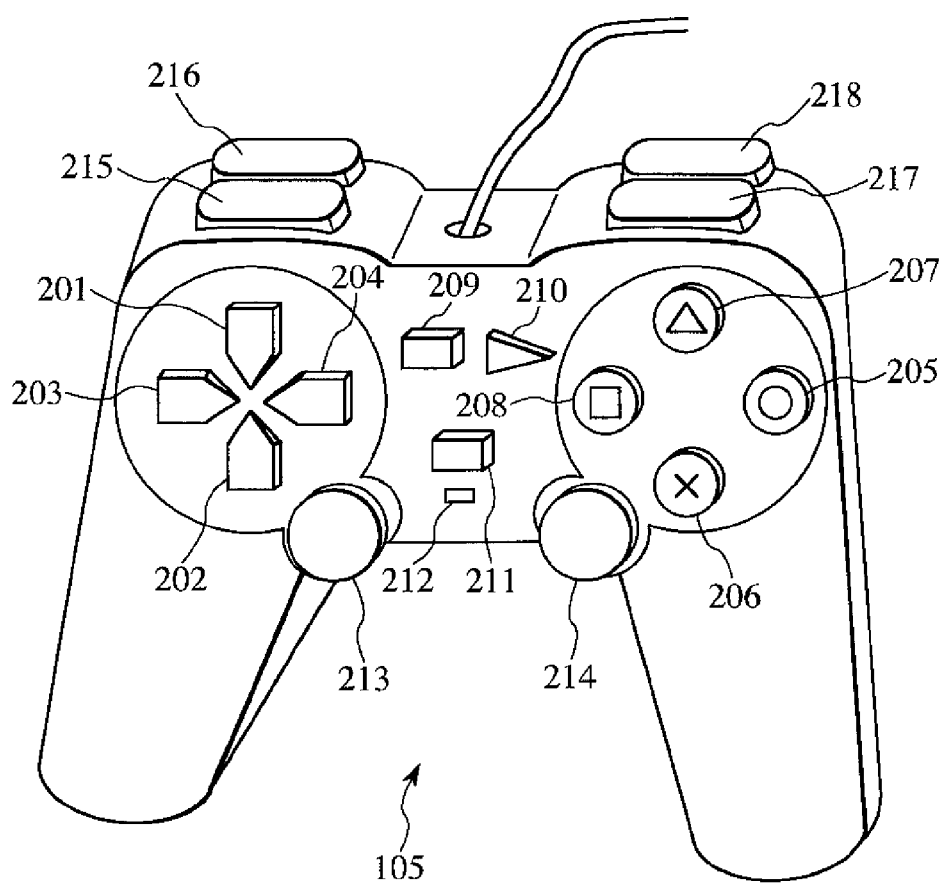
[FIG. 2] An explanatory diagram illustrating an appearance of a controller connected to the information processor.

FIG. 2 is an explanatory diagram illustrating an appearance of the controller 105. In the following, the diagram is referenced to provide a description.

On the left side of the controller 105, there are arranged a ↑ button 201, ↓ button 202, ← button 203, and → button 204 that are used to provide operation inputs indicating "up", "down", "left", and "right".

On the right side, there are arranged a ○ button 205 used to provide decision operation input, an X button 206 used to provide cancel operation input, a △ button 207 used to provide instruction input such as menu display, and a □ button 208 used to provide other instruction input.

In the middle, there are arranged, in addition to a SELECT button 209 and a START button 210, an ANALOG button 211 for instructing start/stop of analog input, and an indicator 212 for displaying whether the analog input is valid or invalid.

Also, in the lower part of the middle, there are arranged joysticks 213 and 214 for providing instruction input involving a magnitude in a direction not limited to up, down, left, or right.

Further, on the upper side, there are arranged an L1 button 215, L2 button 216, R1 button 217, and R2 button 218 that can be used for a various types of instruction input.

Each of the buttons 201 to 208 and 215 to 218 of the controller 105 is equipped with a pressure sensor, and if the analog input is valid, which button is press-operated can be sensed, and in addition, a pressure of the press-operation by the user can be obtained in 256 steps of 0 to 255.

The joysticks 213 and 214 of the controller 105 are respectively equipped with strain gauges, and can therefore sense how much and in which direction the joysticks are bent.

Returning to FIG. 1, the external memory 106 removably connected through the interface 104 rewritably stores: data indicating a play status (a past result or the like) of the game or the like; data indicating an advancement state of the game, data on a log (record) of chat communication for the case of a network match; and the like. The user provides instruction input through the controller 105 to be thereby able to appropriately record these pieces of data in the external memory 106.

The DVD-ROM to be loaded in the DVD-ROM drive 108 records the program for realizing the game, and image data and sound data associated with the game. On the basis of control by the CPU 101, the DVD-ROM drive 108 performs read processing on the DVD-ROM loaded therein to read the required program and data, which are then temporarily stored in the RAM 103 or the like.

The image processing unit 107 processes the data read from the DVD-ROM with use of an image calculation processor (not illustrated) with which the CPU 101 or image processing unit 107 is provided, and then records it in a frame memory (not illustrated) with which the image processing unit 107 is provided. Image information recorded in the frame memory is converted into a video signal at predetermined synchronous timing, and then outputted to a monitor (not illustrated) connected to the image processing unit 107. This enables various types of images to be displayed.

The image calculation processor can perform a superposition calculation of two-dimensional images, transparent calculation such as a blending, and various types of saturate calculations at high speed.

Further, the image calculation processor can also perform, at high speed, a calculation of rendering polygon information, which is arranged in a three-dimensional virtual space and added with various pieces of texture information, by a Z buffer method to obtain a rendering image in which a polygon arranged in the three-dimensional virtual space is looked down from a predetermined view point position in a predetermined visual line direction.

Still further, the CPU 101 and the image calculation processor can cooperatively operate to, according to font information defining a shape of a character, draw a character string in the frame memory or on each surface of the polygon as a two-dimensional image. The font information is recorded in the ROM 102; however, dedicated font information recorded in the DVD-ROM can also be used.

The NIC 109 is one that is intended to connect the information processor 100 to a computer communication network (not illustrated) such as the Internet, and includes: one according to the 10 BASE-T/100 BASE-T standard used for constituting a LAN (Local Area Network); or an analog modem, ISDN (Integrated Services Digital Network) modem, or ADSL (Asymmetric Digital Subscriber Line) modem for make a connection to the Internet with use of a telephone line, a cable modem for making a connection to the Internet with use of a cable TV line, or the like, and an interface (not illustrated) serving as an interface with the CPU 101.

By making a connection to an SNTP server within the Internet through the NIC 109 to obtain information from the server, information on current time and data can be obtained. Also, management server devices of various types of network communication games and SNS may be configured to fulfill the same function as that of the SNTP server.

Once the time and date information is obtained, a counter that fulfills the same function as a real time clock by a timer interrupt may be updated when the information processor 100 is in operation, or if the information processor 100 has the real time clock, an aspect that corrects the time and date information can be employed. In this case, a user may be asked whether or not the correction is made. If the built-in real time clock is not corrected, a difference between information of the real time clock and information actually obtained from a server is retained, and if the time and data information is required, it is only necessary to add the difference to the information obtained from the real time clock.

The sound processing unit 110 converts sound data read from the DVD-ROM into an analog sound signal to output it from a speaker (not illustrated) connected thereto. Also, under the control of the CPU 101, a sound effect or music data to be generated during the advancement of the game is created, and sound corresponding to this is outputted from the speaker.

If the sound data recorded in the DVD-ROM corresponds to MIDI data, the sound processing unit 110 refers to sound source data possessed by this to convert the MIDI data to PCM data. Also, if the sound data corresponds to compressed sound data having an ADPCM format, Ogg Voibis format, or other format, the compressed sound data is extracted to perform conversion to the PCM data. Regarding the PCM data, by performing D/A (Digital/Analog) conversion at timing corresponding to a sampling frequency for the data to provide output to the speaker, sound output becomes possible.

Further, the information processor 100 can be connected with the microphone 111 through the interface 104. In this case, an analog signal from the microphone 111 is subjected to A/D conversion with an appropriate sampling frequency, and can be thereby subjected to processing such as mixing in the sound processing unit 110 as a digital signal having a PCM format.

In the case of using the information processor 100 as a karaoke machine, sound data read from the DVD-ROM or sound data obtained from the computer communication network through the NIC 109, and sound data inputted from the microphone are mixed as accompaniment data and singing data respectively by the sound processing unit 110, and then outputted from the speaker. Alternatively, in place of the speaker, a headphone (not illustrated) or earphone (not illustrated) can also be used to output sound.

Besides, the information processor 100 may be configured to use a large capacity external storage device such as a hard disk to fulfill the same functions as those of the ROM 102, RAM 103, external memory 106, DVD-ROM loaded in the DVD-ROM drive 108, and the like.

Also, there can be employed a configuration that connects a keyboard for receiving character string edition input from a user, a mouse for receiving specification input and selection input of various positions, and the like. Further, in place of the information processor 100 of the present embodiment, a general-purpose personal computer can also be used.

In addition, even if a power supply of a main body is turned off, the real time clock may be adapted to be able to appropriately update the current time and date information; however, there are a factor that if, depending on a configuration of a network communication game, time information controlled by each user control system has a time lag, the game does not properly advance, and other factors, and therefore when the present invention is applied, the current time and date information may be obtained from various types of servers connected through the NIC 109 to adjust time upon start of the game.

The information processor 100 described above corresponds to a so-called "consumer-use TV game device"; however, any device that performs the same processing can realize the present invention. Accordingly, the present invention can be realized on various computers such as a cellular phone, portable game device, karaoke machine, and typical business-use computer.

For example, a typical computer is, similarly to the above information processor 100, provided with a CPU, RAM, ROM, DVD-ROM drive, and NIC, and an image processing unit equipped with a simpler function than that of the information processor 100, and adapted to, in addition to having a hard disk as an external storage device, utilize a flexible disk, magneto-optical disk, magnetic tape, and the like. Also, the typical computer uses not the controller 105 but a keyboard and a mouse as input devices.

Figure 3:
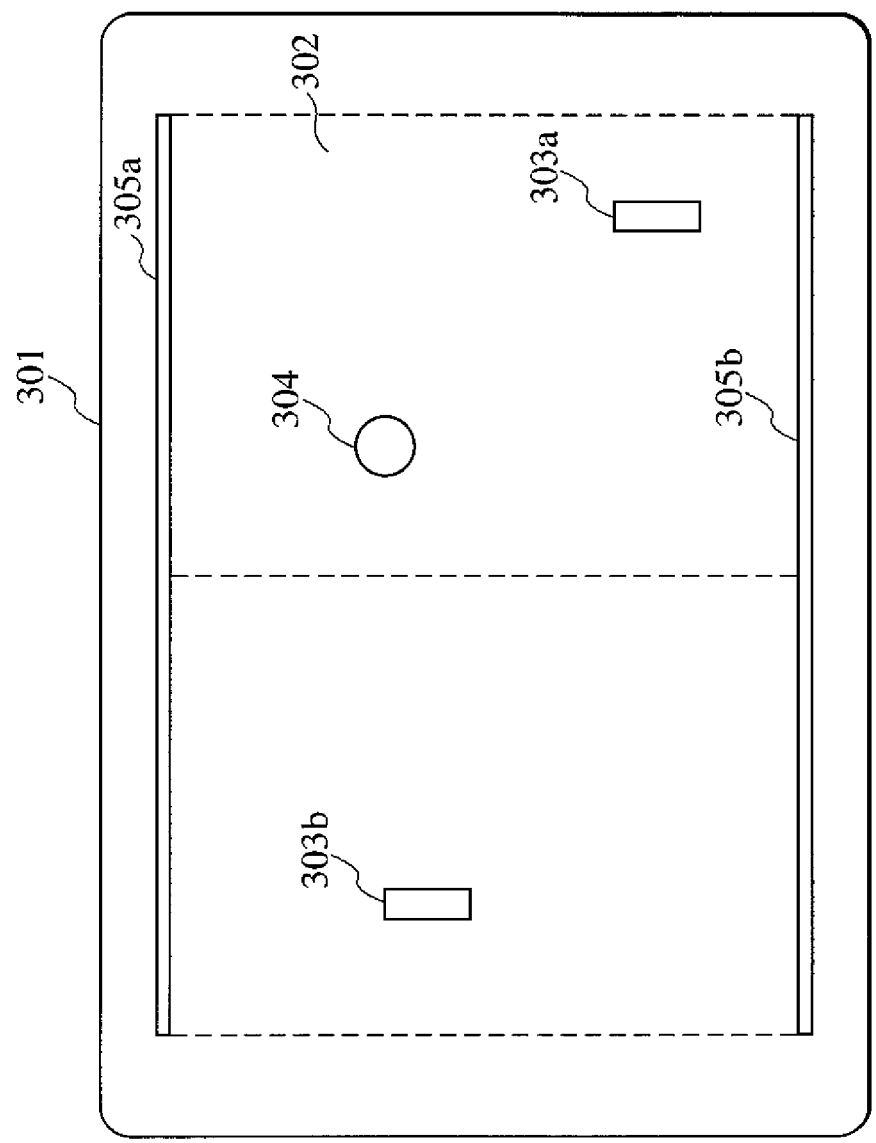
[FIG. 3] An explanatory diagram illustrating an example of screen display of a network match game according to the present embodiment.

FIG. 3 is an explanatory diagram illustrating an example of screen display of a network match game according to the present embodiment. In the following, the diagram is referenced to provide a description.

The network match game illustrated in the diagram is a game similar to tennis or air hockey, and on the right and left sides of a rectangular-shaped court 302 arranged within a screen 301, rackets 303*a* and 303*b* that are operation objects are arranged. Two players respectively operate the rackets 303*a* and 303*b*. At the top and bottom of the court 302, walls 305*a* and 305*b* are arranged; however, at the right or left of the court 302, no wall is arranged.

A position and velocity of each of the rackets 303a and 303b are set such that when a player press-operates the ↑ button 201, ↓ button 202, ← button 203, or → button 204 of the controller 105, the racket moves in a corresponding direction only during the press-operation. However, a limit is imposed such that each of the rackets cannot get out of the court 302.

When a ball 304, which is a mobile body, collides with the racket 303a or 303b, or the upper or lower wall 305a or 305b of the court 302, a velocity of the ball 304 is changed on the basis of a physical simulation that takes into account a relative velocity and frictional force with the object with which the ball 304 collides, and thereby the ball 304 rebounds.

If the ball 304 gets out from the left of the court 302, a player operating the left side racket 303a loses, whereas if the ball 304 gets out from the right of the court 302, a player operating the right side racket 303b loses.

Besides, it may be configured such that a predetermined button of the controller 105 is set for a "miracle ball command"; by preliminarily press-operating the button, the miracle ball command is preliminarily inputted; and when the ball 304 collides with the racket 303a or 303b, not only a change based on the simple physical simulation but a special change is made. As the "miracle ball", various miracle balls are possible, such as one in which the ball 304 passes through an opponent's racket 303a or 303b without rebounding, one in which the ball 304 moves so as to draw a complicated trajectory, and one in which the ball 304 becomes transparent for a certain period of time.

Figure 4:
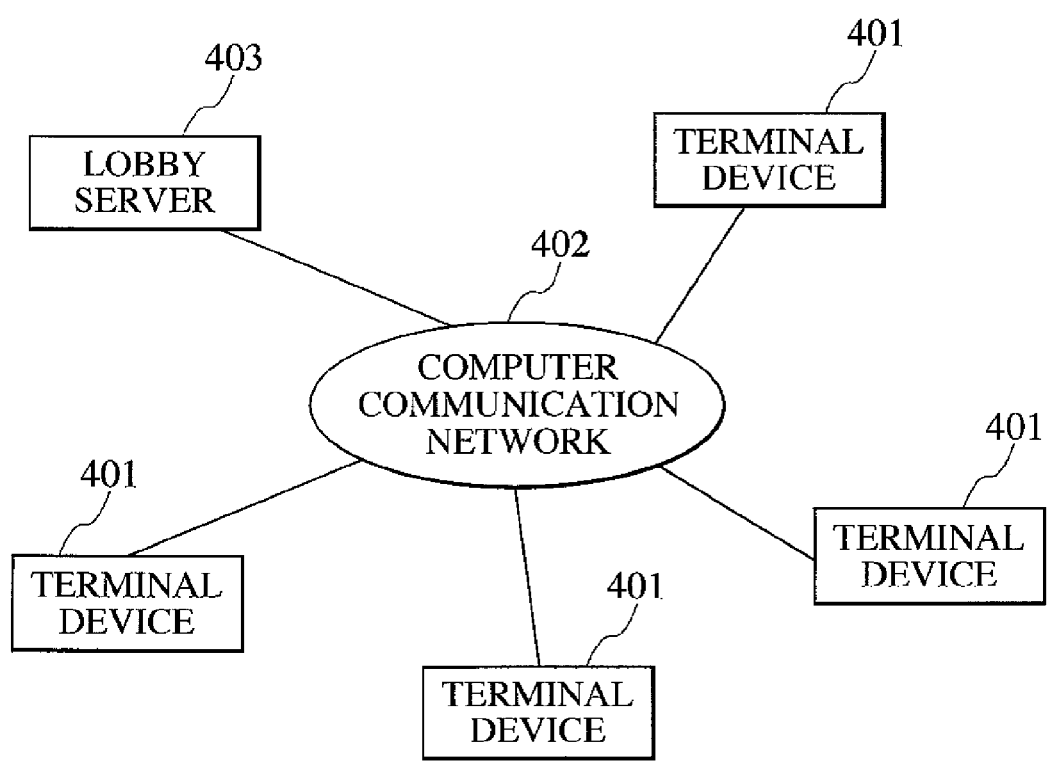
[FIG. 4] A schematic diagram illustrating an outline configuration of a whole of a game system according to the present embodiment.

FIG. 4 is a schematic diagram illustrating an outline configuration of a whole of a game system according to the present embodiment. In the following, the drawing is referenced to provide a description.

As illustrated in the diagram, a plurality of terminal devices 401 are communicably connected through a computer communication network 402 such as the Internet. Each of the terminal devices 401 is realized by the above information processor 100, and when the game is started, it is typical to make an inquiry to a lobby server 403, receive introductions to the mutual terminal devices 401; and start a match; however, it may be configured such that the terminal devices 401 compliant with wireless LAN (Local Area Network) communication communicate ad hoc with each other to thereby start the game.

In the present embodiment, among the plurality of terminal devices 402, a match between two terminal devices, i.e., a match between two players is assumed; however, the present invention can be applied to a game in which any plurality of players can compete. In the present embodiment, among the plurality of terminal devices 401 competing with one another, one terminal device 401 serves as a "parent device", and the "parent device" is in charge of calculation processing of movement of the mobile body (ball 304). The other terminal devices 401 serve as "child devices"

Each of the terminal devices 401 updates, on the basis of instruction input (press-operation of the ↑ button 201, ↓ button 202, ← button 203, or → button 204 of the controller 105) by a player operating the terminal device itself, a position and velocity of an operation object (racket 303a or 303b) operated by the player.

Also, among the terminal devices 401, each child device notifies the parent device of information on an updated position and velocity. The parent device collects the positions and velocities notified from the child devices; notifies the child devices at appropriate timing of the latest positions and velocities of the mobile body (ball 304) and all of the operation objects (rackets 303a and 303b); and shares information between the child and parent devices so as to prevent as much as possible a discrepancy based on communication delay from occurring in information on the positions and velocities of the mobile body and operation objects.

As described above, in the conventional technique, whether to serve as the parent device or not is determined by "turn" on the basis of a rule of a game; however, in the present invention, whether to serve as the parent device or not is determined on the basis of probability of collision between the mobile body and an operation object. That is, an operation object to first collide with the mobile body is estimated, and a terminal device 401 used by a player operating the estimated operation object is made to serve as the parent device.

Also, the respective terminal devices 401 are assigned with identifiers that do not overlap with one another, based on which the terminal devices 401 can be distinguished.

Figure 5:
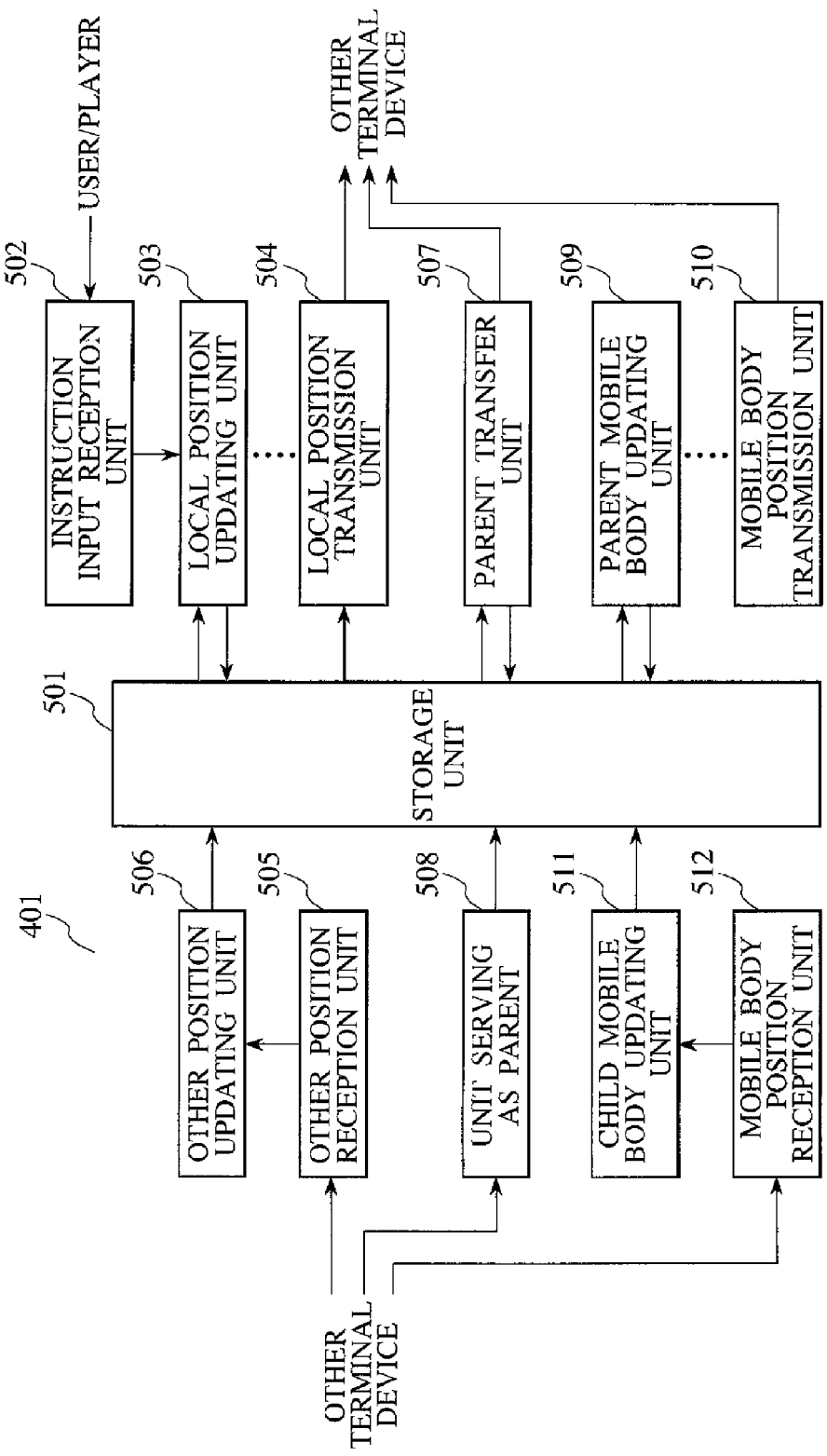
[FIG. 5] A schematic diagram illustrating an outline configuration of a terminal device according to the present embodiment.

FIG. 5 is a schematic diagram illustrating an outline configuration of the terminal device according to the present embodiment. In the following, the drawing is referenced to provide a description.

The terminal device 401 according to the present embodiment is provided with a storage unit 501, instruction input reception unit 502, local position updating unit 503, local position transmission unit 504, other position reception unit 505, other position updating unit 506, parent transfer unit 507, unit serving as parent 508, parent mobile body updating unit 509, mobile body position transmission unit 510, mobile body position reception unit 512, and child mobile body updating unit 511.

The storage unit 501 includes the RAM 103 and the like, and stores the following pieces of information:

(a) The respective operation objects, and identifiers of terminal devices 401 assigned to the operation objects. In the above example, the racket 303a is assigned with the identifier of the terminal device 401 used by the player operating the racket 303a, whereas the racket 303b is assigned with the identifier of the terminal device 401 used by the player operating the racket 303b.

(b) Latest values of the positions and velocities of the respective operation objects, and update time at which the update was made to the latest values. In the example, the terminal devices 401 that update the positions and velocities of the rackets 303a and 303b on the basis of an operation of the controller 105 are different from each other, and therefore in consideration of communication delay, the latest update time is also stored as information. The time is one obtained by measuring an elapsed time since the start of the game in each of the terminal devices 401.

(c) Latest values of a position and velocity of the mobile body, and update time at which the update was made to the latest values. Similarly to the case of the rackets 303a and 303b, a transfer of information from the parent device to the child devices involves a communication delay, and therefore time is also taken into account.

(d) A communication identifier of a terminal device 401 that currently serves as the parent device. Each of the terminal devices 401 compares a stored communication identifier with a self communication identifier, and if both of them are identical to each other, can determine that a current mode corresponds to the parent device, or if both of them are not identical, can determine that the current mode corresponds to the childe device.

(e) Other pieces of information. For example, in the case where one player operates a plurality of operation objects, such as a baseball game or soccer game, it is typical that any of the operation objects is set as an "operation object of current interest" to reflect instruction input by the player in the operation object, and the other operation objects are controlled by the CPU 101 on the basis of a predetermined automatic control algorithm. For this reason, which one is the "operation object of current interest" in a terminal device 401 is stored in the storage unit 501. Note that, in the following, in order to facilitate understanding, unless otherwise stated, a description is provided on the assumption that one player operates one operation object.

Figure 6:
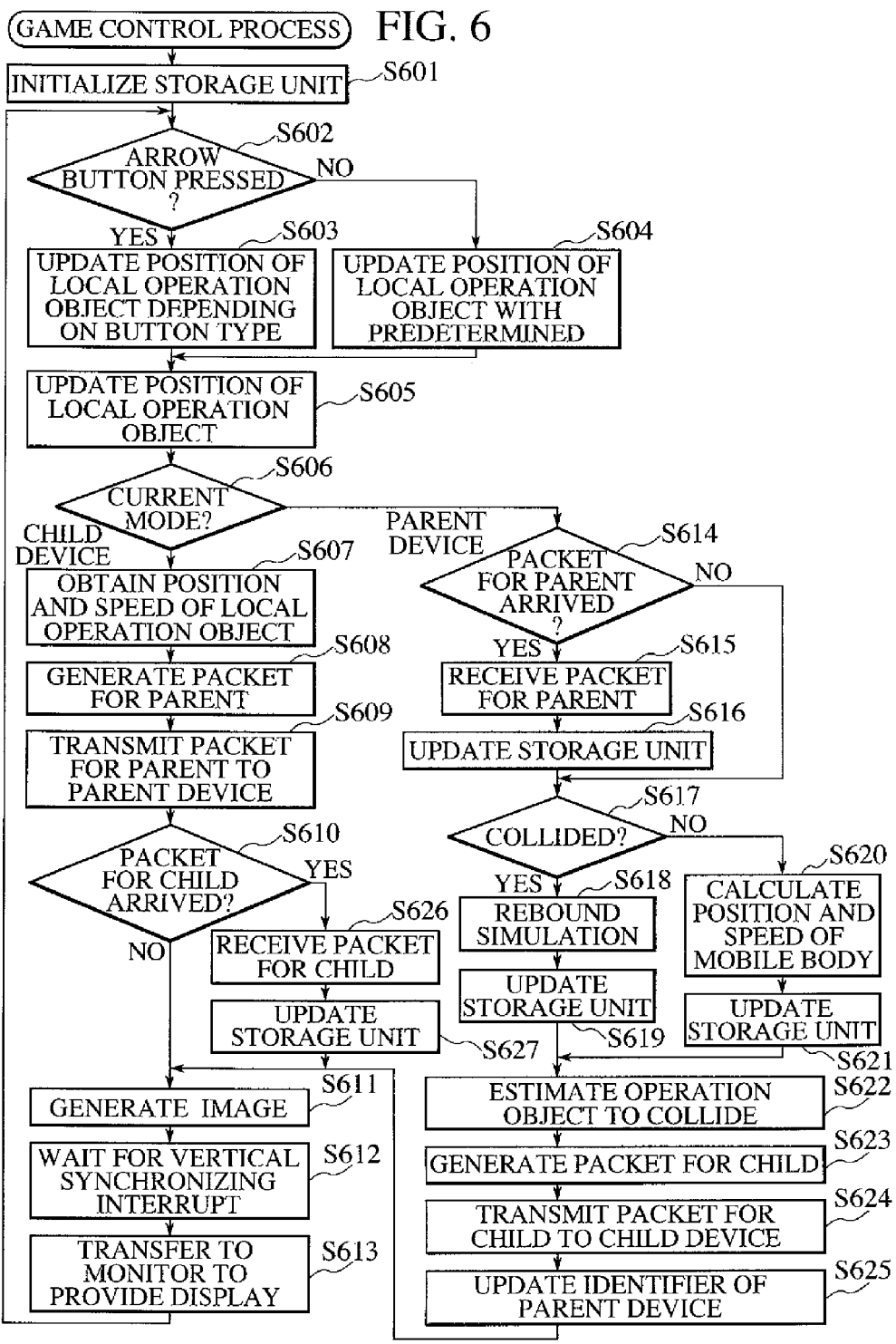
[FIG. 6] A flowchart illustrating a control flow in a game control process performed in each terminal device.

FIG. 6 is a flowchart illustrating a control flow in a game control process performed in each of the terminal devices 401. In the following, the flowchart is referenced to provide a description.

This process is started as a trigger when the introduction from the lobby server 403 or establishment of ad hoc communication enables a match between the terminal devices 401 to start When the match is started, the CPU 101 initializes information stored in the RAM 103 (Step S601). At this time, information stored in the storage unit 501 is appropriately initialized according to the rule of the game.

Typically, positions of the rackets 303a and 303b are set to predetermined positions (in the present embodiment, any positions in the left and right halves of the court 302) based on the rule, and velocities are set to 0. Also, typically, the ball 304 is arranged, in the case of air hockey, in the middle of the court 302, or in the case of tennis, in the vicinity of a service side between the rackets 303a and 303b, and a velocity of the ball 304 is set to 0.

At the start of the game, any one of the terminal devices 401 to compete with each other should be set as the parent device; however, the parent device may be determined on the basis of the rule of the game as in the conventional technique, or on the basis of a random number.

Then, the CPU 101 checks whether or not the ↑ button 201, ↓ button 202, ← button 203, or → button 204 of the controller 105 is press-operated (Step S602). That is, the controller 105 functions as the instruction input reception unit 502.

If any of the buttons is press-operated (Step S602: Yes), a velocity of an operation object assigned to a player of the terminal device 401 is updated depending on the type of the button (Step S603).

To set a vector having a predetermined length in a press-operated direction among the ⎵ button 201, ↓ button 202, ← button 203, and → button 204 as the velocity of the operation object in the storage unit 501 is the simplest update method. In this method, in the direction indicated by the press-operated button, the racket 303a or 303b moves at a constant velocity.

In addition, there may be a method in which the vector having the predetermined length in the press-operated direction is added to the velocity of the operation object in the storage unit 501. This case is equivalent to the case where a force in the direction indicated by the press-operated button is applied to the racket 303a or 303b.

Such a button operation can be appropriately changed depending on the type of a game. For example, in a baseball game, a height to which a pitcher raises his/her hand, timing at which the pitcher releases a ball, timing at which a batter swings a bat, selection indicating which base a fielder throws a caught ball to, or the like is determined, whereas in a tennis or air hockey game, which site to which an operation object such as a racket is moved, which timing at which the operation object is moved, or the like is determined.

On the other hand, if no button is press-operated (Step 5602: No), in the storage unit 501, the velocity of the operation object (local operation object) assigned to the player of the terminal device 401, and update time of the operation object are updated (Step S604). A typical update method is to set the velocity of the racket 303a or 303b to 0. This is preferable for the case where in the direction indicated by the button with which the racket 303a or 303b is press-operated, the racket 303a or 303b is moved at a constant velocity.

In addition, there may be a method that maintains the velocity of the operation object without change. This is preferable for the case where it is assumed that the force in the direction indicated by the button with which the racket 303a or 303b is press-operated is applied.

Also, there may be a method that multiplies the current velocity of the operation object by a constant not less than 0 and less than 1, or reduced the current velocity of the operation object by a predetermined magnitude until the velocity becomes 0. This simulates a frictional force.

When the velocity of the local operation object is updated in this manner (Step S603 or S604), the velocity multiplied by a predetermined very short time (typically, a period of a vertical synchronizing interrupt) is added to the position of the local operation object to update the position of the operation object to be stored in the storage unit 501 (Step S605).

That is, the CPU 101 cooperates with the controller 105, RAM 103, and the like to function as the local position updating unit 503.

By employing such a configuration, when an instruction by a player using a terminal device 401 is inputted, a position and velocity of an operation object operated by the player are immediately reflected in the terminal device 401. Accordingly, the player is very unlikely to feel delay relative to his/her operation.

Subsequently, the CPU 101 determines whether a current mode corresponds to the parent or child device (Step S606). If the current mode corresponds to the child device (Step S606: Child device), the CPU 101 obtains, among operation objects stored in the storage unit 501, the velocity, position, and update time of the local operation object (Step S607), and generates a packet for parent that specifies the obtained information related to the local operation object (Step S608) to transmit it to the parent device (Step S609).

That is, in the packet for parent, the latest values of the position and velocity of the local operation object assigned to the player using the terminal device 401 are specified together with the update time at which the update to the latest values is made (elapsed time since the start of the game).

Also, which terminal device 401 is the current parent device can be checked by, as described above, referring to the information stored in the storage unit 501.

Subsequently, the CPU 101 monitors the NIC 109 to check whether or not a packet for child to be described later has arrived from the parent terminal device 401 (Step S610). If the packet for child does not arrive (Step S610: No), the CPU 101 generates, on the basis of the information on the positions and velocities of the operation objects and mobile body stored in the storage unit 501, an image as illustrated in FIG. 3 in the RAM 103 (Step S611). At this time, as will be described later, correction processing that takes into account a communication delay, or a difference between the update time of the position and velocity and the current time may be appropriately performed.

Then, the CPU 101 waits until a vertical synchronizing interrupt occurs (Step S612); controls the image processing unit 107 to transfer the generated image to the monitor for display (Step S613); and returns to Step 5602. Note that, during waiting for the vertical synchronizing interrupt, other calculation processing (e.g., physical simulation of the mobile body or operation object, or the like) can also be performed in a co-routine manner.

On the other hand, if the current mode corresponds to the parent device (Step S606: Parent device), the CPU 101 monitors the NIC 109 to check whether or not a packet for parent has arrived from any child terminal device 401 (Step S614). If the packet for parent does not arrive, the flow proceeds to Step 5617.

On the other hand, if the packet for parent has arrived (Step 5614: Yes), the packet for parent is entirely received (Step S615), and on the basis of which operation object is specified in the packet for parent, and a position, velocity, and update time of the operation object, the information in the storage unit 501 is updated (Step S615).

In addition, due to communication delay or the like, packets for parent transmitted from the same terminal device 401 may arrive with the order of the packets being reversed; however, in such a case, update time specified in a packet is compared with update time stored in the storage unit 501, and only if the former is time posterior to the latter, an update is made to thereby maintain the latest values.

Subsequently, on the basis of the positions and velocities of all operation objects and the position and velocity of the mobile body stored in the storage unit 501, the parent device determines whether or not each of the operation objects and the mobile body have collided with each other (Step S617), and if they have collided with each other (Step 5617: Yes), a rebound simulation calculation is performed (Step 5618) to update positions and velocities of a colliding operation object and the mobile body after the elapse of an infinitesimal time, and update time in the storage unit 501 (Step S619).

When the collision determination and simulation calculation are performed, the various simulation techniques disclosed in Patent Literature 2 can be applied. Also, when the collision is determined, not only the positions and velocities stored in the storage unit 501 but also the update time is taken into account, and if there is difference between the current time and the update time, a correction may be appropriately made. The correction is the same as that in the above image generation. In the following, in order to facilitate understanding, description of such correction processing is appropriately omitted.

Also, the collision determination is performed for all of the operation objects, however, in the present embodiment, the operation object assigned to the parent device is arranged in the vicinity of the mobile body, and therefore, in most cases, objects to collide with each other are the operation object assigned to the parent device and the mobile body.

Accordingly, an operating situation of the ○ button 205, X button 206, Δ button 207, □ button 208, or the like of the controller 105 may be monitored here to update the velocity and position of the mobile body depending on the situation of press-operation. For example, in the case where, on a fielding side of baseball, the ○ button 205 is assigned to "operation of catching a ball", if a distance between a character and the ball is equal to or less than a certain threshold, and the ○ button 205 is press-operated, the "ball catch" is successful, and then an update is made such that, until the ball is released, a position and velocity of the character coincide with a position and velocity of the ball. A method for this can be applied with various publicly known techniques based on a rule of the game.

On the other hand, if they do not collide with each other (Step 5617: No), on the basis of the position, velocity, and update time stored in the storage unit 501, a position and velocity of the mobile body after the elapse of an infinitesimal time are calculated (Step S620) to update the position, velocity, and update time of the mobile body in the storage unit 501 (Step S621). In the calculation in Step S620, typically, on the assumption that the mobile body exhibits uniform linear motion or uniformly accelerated motion, or is applied with a frictional or viscous force, a physical simulation is performed. Further, collisions with the walls 305a and 305b are also simulated in this step.

That is, the CPU 101 functions as the parent mobile body updating unit 509 in cooperation with the RAM 103.

After the position and velocity of the mobile body in the storage unit 501 have been updated (Step S619 or S621), the CPU 101 of the parent terminal device 401 estimates, from the positions, and velocities (and update times) of the respective operation objects and the position and velocity (and update time) of the mobile body stored in the storage unit 510, which one is an operation object to come into contact with the mobile body (Step S622). A specific method for this will be described later.

Also, after the position and velocity of the mobile body have been updated (Step S619 or S621), it is typical to, before the estimation in Step S622, apply a publicly known technique in which whether or not the mobile body (ball 304) has got out of the court 302 is determined; then the parent device determines winning or losing to notify the child device of this; and this processing is terminated; however, in order to facilitate understanding, for details of the processing, description is omitted.

After the operation object to come into contact with the mobile body has been estimated (Step S622), the CPU 101 generates, in the RAM 103, a packet for child specifying the following pieces of information (Step S623).

(a) An identifier of a terminal device 401 assigned to the estimated operation object. This information means a terminal device 401 to become the parent device next.

(b) The positions, velocities, and update times of all of the operation objects, and the position, velocity, and update time of the mobile body stored in the storage unit 501.

Then, under the control of the CPU 101, the NIC 109 transmits the generated packet for child to the terminal device 401 serving as the child device (Step S624).

Subsequently, the "identifier of the terminal device 401 currently serving as the parent device" is overwritten and updated with the identifier of the operation object estimated in Step S622 (Step S625), and the flow proceeds to Step S611. In addition, it may be configured such that whether or not the both are identical is preliminarily determined, and if the both are identical, the overwriting is avoided.

Meanwhile, the packet for child transmitted in Step S624 for the parent terminal device 401 is determined whether or not to arrive in Step S610 in the child terminal device 401. If the packet for child has arrived (Step S610: Yes), the packet for child is entirely received (Step S626) to update, on the basis of which one is an operation object specified in the packet for child, a position, velocity, and update time of the operation object, and the identifier of the terminal device 401 to become the parent device next, the information in the storage unit 501 (Step S627), and the flow proceeds to Step S611.

As described, the transfer of "parent" that is, in the conventional technique, made on the turn basis or time basis is, in the present technique, made by updating the "identifier of the terminal device 401 currently serving as the parent device" in the storage unit 501 on the basis of, in the parent device, the identifier in Step S625, or in the child device, the identifier specified in the packet for child. Based on this, differently from the conventional technique, the parent and child devices are determined with keeping equality depending on player's operational skill.

In addition, due to communication delay or the like, or the collision determination in the parent device or the like, the velocity and position of the operation object assigned to the child terminal device 401 may be updated; however, in such a case, the update time specified in the packet for child and the update time stored in the storage unit 501 are compared with each other, and only if the former is time posterior to the latter, an update may be made, values stored in the packet for child may be preferentially used, or from two sets of positions, velocities, and update times (one is from the storage unit 501, and the other one is from the packet for child), a position and velocity at the current time may be estimated by internal division/extrapolation, and these values may be used to make an update.

As described, the CPU 101 functions, in cooperation with the NIC 109, RAM 103, and the like, as the local position transmission unit 504, other position reception unit 505, other position updating unit 506, parent transfer unit 507, unit serving as parent 508, mobile body position transmission unit 510, mobile body position reception unit 512, and child mobile body updating unit 511.

In addition, in the above aspect, the packet for parent is transmitted by the local position transmission unit 504 of the child device, and received by the other position reception unit 505 of the parent device, and the packet for child is transmitted by the local position transmission unit 504, mobile body position transmission unit 510, and parent transfer unit 507 of the parent device, and received by the other position reception unit 505, mobile body position reception unit 512, and unit serving as parent 508 of the child device; however, the respective pieces of information may be separately transmitted/received in separate packets.

Meanwhile, in a game such as a ball game, it is thought that a player particularly focuses on a character and racket that are present in the vicinity of a ball. Accordingly, what instruction input in the controller 105 should be immediately reflected in is a terminal device 401 used by a player operating the character and racket present in the vicinity of the ball. In the present embodiment, such a terminal device 401 is estimated, and made to serve as the parent device.

In the following, in order to determine a terminal device 401 that should be made to serve as the parent device, various methods for determining an operation object that is expected to come into contact with a mobile body soon are described.

Figure 7:
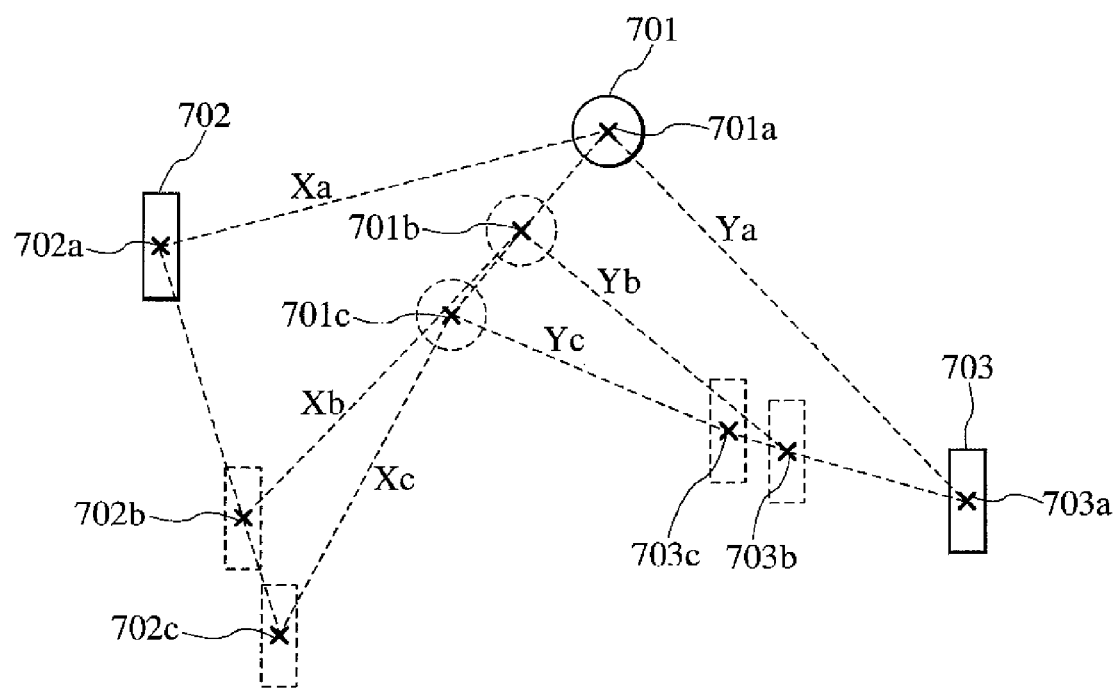
[FIG. 7] An explanatory diagram illustrating positional relationships between a mobile body and operation objects.

FIG. 7 is an explanatory diagram illustrating positional relationships between a mobile body and operation objects. In the following, the diagram is referenced to provide a description.

In the diagram, positions of one mobile body 701 and two operation objects 702 and 703 at different times are presented.

In the following, it is assumed that a position, velocity, update time, current time, and time after a predetermined time since the current time (hereinafter referred to as "future time") stored in the storage unit 501 are respectively denoted by p, v, A, T, and S (S>T). In the diagram, a numerical symbol is added with an alphabetic character a, b, or c as a subscript to present any of three positions of the same object. Here, (a) A position a corresponds to p,
(b) A position b corresponds to p+v(T−A), and
(c) A position c corresponds to p+v(S−A).

For example, a position 701a of the mobile body 701 is a position itself stored in the storage unit 501.

A position 701b is a position moved from the position 701a by an amount equal to a velocity, which is stored in the storage unit 501, multiplied by a difference between the current time and the update time stored in the storage unit 501.

A position 701c is a position moved from the position 701a by an amount equal to the velocity, which is stored in the storage unit 501, multiplied by a difference between the future time and the update time stored in the storage unit 501.

The same holds true for positions 702a, 702b, and 702c of the operation object 702, and positions 703a, 703b, and 703c of the operation objects 703.

The methods for estimating which one of the operation objects 702 and 703 is to come into contact with the mobile body 701 include various methods as described below:

(a) A distance Xa between the positions 701a and 702a and a distance Ya between the positions 701a and 703a are compared with each other, and if the former is shorter, the operation object 702 is determined as a result of the estimation, whereas if the latter is shorter, the operation object 703 is determined as the estimation result. This is a method utilizing the positions themselves stored in the storage unit 501.

(b) A distance Xb between the positions 701b and 702b and a distance Yb between the positions 701b and 703b are compared with each other, and if the former is shorter, the operation object 702 is determined as the estimation result, whereas if the latter is shorter, the operation object 703 is determined as the estimation result. This is a method that estimates the current positions to consider the distances.

(c) A distance Xc between the positions 701c and 702c and a distance Yc between the positions 701c and 703c are compared with each other, and if the former is shorter, the operation object 702 is determined as a result of the estimation, whereas if the latter is shorter, the operation object 703 is determined as a result of the estimation. This is a method that estimates the near-future positions to consider the distances.

(d) If the smallest one among Xa, Ya, Xb, and Yb is any one of Xa and Xb, the operation object 702 is determined as the estimation result, whereas if it is any one of Ya and Yb, the operation object 703 is determined as the estimation result.

(e) If the smallest one among Xb, Yb, Xc, and Yc is any one of Xb and Xc, the operation object 702 is determined as the estimation result, whereas if it is any one of Yb and Yc, the operation object 703 is determined as the estimation result.

(f) If the smallest one among Xc, Yc, Xa, and Ya is any one of Xc and Xa, the operation object 702 is determined as the estimation result, whereas if it is any one of Yc and Ya, the operation object 703 is determined as the estimation result.

(g) If the smallest one among Xa, Ya, Xb, Yb, Xc, and Yc is any one of Xa, Xb, and Xc, the operation object 702 is determined as the estimation result, whereas if it is any one of Ya, Yb, and Yc, the operation object 703 is determined as the estimation result.

These are methods that obtain, from the measurement times of positions, current estimated positions, and future estimated positions, the distances between the mobile body 701 and the operation objects 702 and 703 to determine the estimation result.

In addition, it is preliminarily checked whether the mobile body 701 comes close to the operation object 702 or 703, and only if it comes close to any one of them, it is also possible to determine the one as a candidate of the estimation result. That is, if the mobile body 701 comes close to the operation object 702, $$Xa \geq Xb \geq Xc$$

is suppose to hold, whereas if the mobile body 701 comes close to the operation object 703, $$Ya \geq Yb \geq Yc$$

is supposed to hold.

For example, in the case of the above (d), (d1) if Xa≧Xb and Ya≧Yb, the smallest value is obtained to determine the estimation result, similarly to the above (d), (d2) if Xa≧Xb and Ya<Yb, the operation object 702 is determined as the estimation result, (d3) if Xa<Xb and Ya≧Yb, the operation object 703 is determined as the estimation result, or (d4) if Xa<Xb and Ya<Yb, the smallest value is obtained to determine the estimation result, similarly to the above (d).

The same holds true for the above (e) to (g).

These are all ones representing various aspects of the method for estimating an operation object that is expected to come into contact with the mobile body soon in terms of time in the present invention, and an appropriate method can be appropriately selected depending on the type, difficulty, or the like of a game, or intended use.

According to the present embodiment, a player can immediately reflect his/her operation in his/her operation object, and if a mobile body such as a ball and his/her operation object are about to come into contact with each other to change a position and velocity of the mobile body, calculations of determination of a collision with the mobile body, and the like are performed in his/her terminal device to be thereby able to immediately reflect an operation for the mobile object through the operation object, so that an intension of the player is more naturally reflected in the operation object and a game.

Embodiment 2

In the above-described embodiment, an operation object to come into contact with a mobile body soon in terms of time is obtained from a distance between the both; however, in the present embodiment, the operation object is estimated on the basis of a position at which the mobile body is present.

For example, in the case of tennis, a player cannot move in the entire court, but his/her movable range is only a half. This situation corresponds to the case of a game imposed with a rule under which, in the example illustrated in FIG. 3, the racket 303a can move only in the right half of the court 302, and the racket 303b can move in the left half of the court 302.

In the present embodiment, if the ball 304 is present in the right half, a terminal device 401 used by a player operating the racket 303a is set as the parent device, whereas if the ball 304 is present in the left half, a terminal device 401 used by a player operating the racket 303b is set as the parent device.

More generally, a virtual space is divided into a plurality of regions so as to avoid overlapping, and each of the regions is assigned with any of operation objects without overlapping. In this case, a moving range of an operation object is preferably limited within a corresponding region; however, depending on a rule of a game, such a limitation may not be necessarily imposed.

Then, depending on which region a position (a position itself stored in the storage unit 501, or a current or future position calculated on the basis of the position) of a mobile body is included in, an operation object to come into contact with the mobile body is determined.

This can also be applied to the case of a baseball game. That is, a baseball field is divided into regions according to fixed positions of a pitcher, catcher, and fielders; however, the vicinity of a path from the pitcher to a batter is set as a region assigned with the batter.

In the present embodiment, because the parent device is immediately determined by a position of a mobile body, a calculation load can be made smaller, and besides because whether or not oneself is the parent device is immediately determined from the position of the mobile body, it is not necessary to specify the "identifier of the next parent device" in the packet for child.

Embodiment 3

In the above description, the description is provided on the assumption that two terminal devices 401 compete with each other; however, the above-described embodiments can also be applied to the case of three or more terminal devices.

In particular, in the above-described embodiments, pieces of information on positions of operation objects moved by child devices are once collected in a parent device by packets for parent, and then transmitted from the parent device to the child devices by packets for child.

However, depending on the number of terminal devices 401, the pieces of position information are not collected in the parent device, but every time a position and velocity are updated, the other terminal devices 401 may be directly informed of this.

In the above-described embodiments, in the case of three or more terminal devices 401, there is an effect of reducing an amount of packets communicated by mutual communications; however, in the present embodiment, an amount of communication packets may be increased, but the pieces of position information are more frequently updated, and therefore more accurate processing can be performed.

Embodiment 4

In the above description, the parent and child devices are determined on the assumption that the number of mobile body is one; however, the number of mobile body may be two or more. For example, in a snowball fight based game or ball-toss based game, snowballs or beanbags correspond to mobile bodies, and the plurality of mobile bodies respectively move in a virtual space.

In this case, for each of the plurality of mobile bodies, each terminal device 401 enters any of a "parent device controlling the mobile body" mode and a "child device having the mobile body controlled by another terminal device 401" mode.

Accordingly, for each of the mobile bodies, the storage unit 501 stores pieces of information on:

(a) a position and velocity of the mobile body, and (b) whether or not the mobile body is controlled by the terminal device 401 (whether the parent device of the mobile body or nor).

Also, the parent transfer unit 507 estimates an operation object to come into contact for each of mobile bodies controlled by the terminal device 401, and the unit serving as parent 508 receives a notification specifying information on which mobile body a "parent device" to be transferred is for.

In the parent mobile body updating unit 509, processing of calculating contact, collision, rebound, and the like between each of the mobile bodies and each of the operation objects is the same as that in each of the above-described embodiments.

Regarding the collision between mobile bodies, it can be configured such that the mobile bodies pass through each other, and do not collide with each other in the first place.

Besides, even if mobile bodies collide with each other, if the number of mobile bodies is large, the number of combinations of collision calculations may become enormous. For this reason, regarding the collisions between mobile bodies, the simulation may be simplified such that mobile bodies controlled by the respective terminal devices 401 collide with each other, but in the case of the other combinations, no collision occurs, and thereby a calculation amount may be suppressed.

The case where the collision between mobile bodies makes an impression from the viewpoint of a player is thought to be the case where the mobile bodies collide with each other in the vicinity of a character operated by the player (i.e., in a region the player focuses on within a screen), and this is because it is thought that, for both of the mobile bodies, a terminal device 401 operated by the player serves as a parent device.

Embodiment 5

In the above-described embodiment, the example of the "miracle ball command" is used to refer to the example where a trajectory of ball movement is changed by an operation of a character selected by a player; however, in a baseball game, there is a command in which after an operation of "throwing a ball", "hitting a ball", or the like (such a command can also be preliminarily inputted while a ball is coming close to a character), the ball is assumed to move away from a player who has performed the operation.

As described above, a situation where after an operation is employed, a mobile body is assumed to move away corresponds to, for example, in a soccer game, "to kick a ball", or in a tennis game, "to swing a racket".

Accordingly, if an operation in which a ball is assumed to move away is specified by a command, the operation is performed by a character, and after a result of the operation has been reflected in a position and velocity of the mobile body, the character having performed the operation is though to be no longer an "operation object (assumed) to come close to the mobile body".

Also, as in a doubles tennis game, in the case where a ball travels back and forth between one's own field and an opponent's field, it is though that a side not corresponding to a field on a side of a character having performed the operation may be set as an "operation object (assumed) to come close to the mobile body.

For this reason, in the case of a game in which such an operation command is set, after an effect of the operation command has been reflected in a position and velocity of a mobile body, for a certain period of time, from search objects for the "operation object (assumed) to come close to the mobile body", a character operated by a player having inputted the operation command is removed, and thereby a parent transfer can be further smoothly performed.

Specifically, when a simulation calculation in the parent mobile body updating unit 509 is performed, the type of an operation command is taken into account, and if the type is a predetermined type as described above, in Step S622, one character having executed the operation command, or all characters operated by a player having inputted the operation command are removed from search objects for the "operation object (assumed) to come close to a mobile body", whereas for the other characters, variations in distances to the ball, or the like are checked to estimate a character to which the ball is assumed to come close.

As described, it is thought that, by varying search objects for estimation depending on the type of an operation command having been executed, a parent transfer can be further smoothly performed.

This application claims priority rights based on Japanese Patent Application No. 2007-319243 (filed on Dec. 11, 2007), and the entire content of the basic application is incorporated herein by reference as far as the laws of the designated states permit.

Industrial Applicability

As has been described above, according to the present invention, there can be provided a terminal device and game control method that are preferable for, in a network match game such as a ball game, more naturally reflecting an intension of a user such as a player in the operation of an operation object such as a character, a computer-readable information recording medium that records a program for realizing them on a computer, and the program.

The invention claimed is:

1. A terminal device that is any of a plurality of mutually communicable terminal devices possessed by a game system that moves a plurality of operation objects and one mobile body in a virtual space, the terminal device comprising:

a storage unit that stores respective positions and respective velocities of the plurality of operation objects, and a position and a velocity of the mobile body, and stores whether a mode of the terminal device corresponds to a parent device or a child device;

an instruction input reception unit that receives instruction input from a user assigned to the terminal device;

a local position updating unit that updates in the storage unit, on a basis of the received instruction input, a position where an operation object assigned to the user is arranged and a velocity of the operation object among the plurality of operation objects;

a local position transmission unit that transmits the updated position and the updated velocity of the operation object assigned to the user to other terminal devices among the plurality of terminal devices;

an other position reception unit that receives positions and velocities of operation objects assigned to other users, the positions and the velocities being transmitted from the other terminal devices among the plurality of terminal devices;

an other position updating unit that updates in the storage unit the received positions and the received velocities of the operation objects assigned to the other users;

a parent transfer unit that, in a case where the mode of the terminal device corresponds to the parent device, from the respective positions and the respective velocities of the plurality of operation objects, and the position and the velocity of the mobile body, estimates which operation object will next come into contact with the mobile body, and if a terminal device assigned with a user assigned with the estimated operation object is another terminal device, updates the mode of the terminal device to a mode corresponding to the child device in the storage unit to notify the another terminal device that the another terminal device should serve as the parent device;

a parent serving update unit that, in a case where the mode of the terminal device corresponds to the child device, if the terminal device is notified from any of the other terminal devices that the terminal device should serve as the parent device, updates the mode of the terminal device to the mode corresponding to the parent device in the storage unit;

a parent mobile body updating unit that, in the case where the mode of the terminal device corresponds to the parent device, from the respective positions and the respective velocities of the plurality of operation objects, and the position and the velocity of the mobile body, determines whether or not the mobile body comes into contact with the plurality of operation objects, and on a basis of a result of the determination, updates the position and the velocity of the mobile body in the storage unit;

a mobile body position transmission unit that, in the case where the mode of the terminal device corresponds to the parent device, transmits the updated position and the updated velocity of the mobile body to the other terminal devices among the plurality of terminal devices;

a mobile body position reception unit that, in the case where the mode of the terminal device corresponds to the child device, receives the position and the velocity of the mobile body, the position and the velocity being transmitted from, among the plurality of terminal devices, a terminal device having the mode corresponding to the parent device; and a child mobile body updating unit that updates in the storage unit the received position and the received velocity of the mobile body.

2. The terminal device according to claim 1, wherein:

the local position transmission unit makes the terminal device having the mode corresponding to the parent device among the plurality of terminal devices serve as a relay to transmit the position and the velocity of the operation object to the other terminal devices; and the other position reception unit makes the terminal device having the mode corresponding to the parent device among the plurality of terminal devices serve as a relay to receive the positions and velocities of the operation objects assigned to the other users, the positions and the velocities being transmitted from the other terminal devices.

3. The terminal device according to claim 1, wherein the parent transfer unit obtains, for each of the plurality of operation objects, a current distance between the operation object and the mobile body, and estimates that an operation object having a shortest current distance is an operation object to come into contact with the mobile body.

4. The terminal device according to claim 1, wherein the parent transfer unit obtains, for each of the plurality of operation objects, a future distance between the operation object and the mobile body, the future distance being based on an assumption that the operation object and the mobile body move for a predetermined period of time based on the stored positions and the stored velocities, and estimates that an operation object having a shortest future distance is an operation object to come into contact with the mobile body.

5. The terminal device according to claim 1, wherein the parent transfer unit obtains, for each of the plurality of operation objects, a current distance between the operation object and the mobile body, and a future distance between the operation object and the mobile body, the future distance being based on an assumption that the operation object and the mobile body move for a predetermined period of time based on the stored positions and the stored velocities, and estimates that an operation object having a distance that is obtained to be shortest among the current distances and the future distances is an operation object to come into contact with the mobile body.

6. The terminal device according to claim 1, wherein the parent transfer unit obtains, for each of the plurality of operation objects, a current distance between the operation object and the mobile body, and a future distance between the operation object and the mobile body, the future distance being based on an assumption that the operation object and the mobile body move for a predetermined period of time based on the stored positions and the stored velocities, and estimates that, among operation objects each having a future distance smaller than a current distance, an operation object having a shortest future distance is an operation object to come into contact with the mobile body.

7. The terminal device according to claim 1, wherein:

each of the plurality of operation objects is preliminarily assigned with any of a plurality of regions into which the virtual space is divided so as to avoid overlapping;

the local position updating unit makes an update such that the position of the operation object assigned to the user is included in a region preliminarily assigned to the operation object; and the parent transfer unit estimates that an operation object assigned to a region including the position of the mobile body among the plurality of regions is an operation object to come into contact with the mobile body.

8. The terminal device according to claim 1, wherein the instruction input to be received includes instruction input that selects an operation to be performed on the mobile body when, among the plurality of operation objects, the operation object assigned to the user comes close to the mobile body; and the parent mobile body updating unit updates, if the received instruction input includes the instruction input that selects the operation, the position and the velocity of the mobile body according to the operation.

9. The terminal device according to claim 8, wherein after the parent mobile body updating unit has updated the position and the velocity of the mobile body according to the operation, if the operation is an operation in which the mobile body is assumed to move away from the operation object assigned to the user, the parent transfer unit, in estimating which operation object will next come into contact with the mobile object, disregards the operation assigned to the user.

10. A terminal device that is any of a plurality of mutually communicable terminal devices possessed by a game system that moves a plurality of operation objects and one or more mobile bodies in a virtual space, the terminal device comprising:

a storage unit that stores respective positions and respective velocities of the plurality of operation objects, and respective positions and respective velocities of the one or more mobile bodies, and stores whether or not the terminal device controls each of the one or more mobile bodies;

an instruction input reception unit that receives instruction input from a user assigned to the terminal device;

a local position updating unit that updates in the storage unit , on a basis of the received instruction input, a position where an operation object assigned to the user is arranged and a velocity of the operation object among the plurality of operation objects;

a local position transmission unit that transmits the updated position and the updated velocity of the operation object assigned to the user to other terminal devices among the plurality of terminal devices;

an other position reception unit that receives positions and velocities of operation objects assigned to other users, the positions and the velocities being transmitted from the other terminal devices among the plurality of terminal devices;

an other position updating unit that updates in the storage unit the received positions and the received velocities of the operation objects assigned to the other users;

a parent transfer unit that, for each of mobile bodies controlled by the terminal device among the one or more mobile bodies, estimates which operation object will next come into contact with the mobile body from the respective positions and the respective velocities of the plurality of operation objects, and a position and a velocity of the mobile body, and if a terminal device assigned with a user assigned with the estimated operation object is another terminal device, makes an update in the storage unit such that the terminal device does not control the mobile body, and notifies the another terminal device that the another terminal device should control the mobile body;

a parent serving update unit that, if the terminal device is notified from any of the other terminal devices among the plurality of terminal devices that the terminal device should control some mobile body, makes an update in the storage unit such that the terminal device controls the mobile body;

a parent mobile body updating unit that, for each of the mobile bodies controlled by the terminal device among the one or more mobile bodies, determines whether or not the mobile body comes into contact with the plurality of operation objects or other mobile bodies among the one or more mobile bodies, from the respective positions and the respective velocities of the plurality of operation objects, and a position and a velocity of the mobile body, and on a basis of a result of the determination, updates the position and the velocity of the mobile body in the storage unit;

a mobile body position transmission unit that, for each of the mobile bodies controlled by the terminal device among the one or more mobile bodies, transmits the updated position and the updated velocity of the mobile body to the other terminal devices among the plurality of terminal devices;

a mobile body position reception unit that receives a position and a velocity of some mobile body, the position and the velocity being transmitted from any of the other terminal devices among the plurality of terminal devices; and a child mobile body updating unit that updates in the storage unit the received position and the received velocity of the mobile body.

11. A game control method performed by each of a plurality of mutually communicable terminal devices possessed by a game system that moves a plurality of operation objects and one or more mobile bodies in a virtual space, wherein each of the plurality of terminal devices has a storage unit, and the storage unit stores respective positions and respective velocities of the plurality of operation objects, and respective positions and respective velocities of the one or more mobile bodies, and stores whether or not the terminal device controls each of the one or more mobile bodies, the game control method comprising:

an instruction input reception step that receives instruction input from a user assigned to the terminal device;

a local position updating step that updates in the storage unit , on a basis of the received instruction input, a position where an operation object assigned to the user is arranged and a velocity of the operation object among the plurality of operation objects;

a local position transmission step that transmits the updated position and the updated velocity of the operation object assigned to the user to other terminal devices among the plurality of terminal devices;

an other position reception step that receives positions and velocities of operation objects assigned to other users, the positions and the velocities being transmitted from the other terminal devices among the plurality of terminal devices;

an other position updating step that updates in the storage unit the received positions and the received velocities of the operation objects assigned to the other users;

a parent transfer step that, for each of mobile bodies controlled by the terminal device among the one or more mobile bodies, estimates which operation object will next come into contact with the mobile body from the respective positions and the respective velocities of the plurality of operation objects, and a position and a velocity of the mobile body, and if a terminal device assigned with a user assigned with the estimated operation object is another terminal device, makes an update in the storage unit such that the terminal device does not control the mobile body, and notifies the another terminal device that the another terminal device should control the mobile body;

a serving-as-parent step that, if the terminal device is notified from any of the other terminal devices among the plurality of terminal devices that the terminal device should control some mobile body, makes an update in the storage unit such that the terminal device controls the mobile body;

a parent mobile body updating step that, for each of the mobile bodies controlled by the terminal device among the one or more mobile bodies, determines whether or not the mobile body comes into contact with the plurality of operation objects or other mobile bodies among the one or more mobile bodies, from the respective positions and the respective velocities of the plurality of operation objects, and a position and a velocity of the mobile body, and on a basis of a result of the determination, updates the position and the velocity of the mobile body in the storage unit;

a mobile body position transmission step that, if a mode of the terminal device corresponds to a parent device, transmits the updated position and the updated velocity of the mobile body to the other terminal devices among the plurality of terminal devices;

a mobile body position reception step that receives a position and a velocity of some mobile body, the position and the velocity being transmitted from any of the other terminal devices among the plurality of terminal devices; and a child mobile body updating step that updates in the storage unit the received position and the received velocity of the mobile body.

12. A game control method performed by each of a plurality of mutually communicable terminal devices possessed by a game system that moves a plurality of operation objects and one mobile body in a virtual space, wherein each of the plurality of terminal devices has a storage unit, and the storage unit stores respective positions and respective velocities of the plurality of operation objects, and a position and a velocity of the mobile body, and stores whether a mode of the terminal device corresponds to a parent device or a child device, the game control method comprising:

an instruction input reception step that receives instruction input from a user assigned to the terminal device a local position updating step that updates in the storage unit, on a basis of the received instruction input, a position where an operation object assigned to the user is arranged and a velocity of the operation object among the plurality of operation objects;

a local position transmission step that transmits the updated position and the updated velocity of the operation object assigned to the user to other terminal devices among the plurality of terminal devices;

an other position reception step that receives positions and velocities of operation objects assigned to other users, the positions and the velocities being transmitted from the other terminal devices among the plurality of terminal devices;

an other position updating step that updates in the storage unit the received positions and the received velocities of the operation objects assigned to the other users;

a parent transfer step that, in a case where the mode of the terminal device corresponds to the parent device, from the respective positions and the respective velocities of the plurality of operation objects, and the position and the velocity of the mobile body, estimates which operation object will next come into contact with the mobile body, and if a terminal device assigned with a user assigned with the estimated operation object is another terminal device, updates the mode of the terminal device to a mode corresponding to the child device in the storage unit to notify the another terminal device that the another terminal device should serve as the parent device;

a serving-as-parent step that, in a case where the mode of the terminal device corresponds to the child device, if the terminal device is notified from any of the other terminal devices that the terminal device should serve as the parent device, updates the mode of the terminal device to the mode corresponding to the parent device in the storage unit;

a parent mobile body updating step that, in the case where the mode of the terminal device corresponds to the parent device, from the respective positions and the respective velocities of the plurality of operation objects, and the position and the velocity of the mobile body, determines whether or not the mobile body comes into contact with the plurality of operation objects, and on a basis of a result of the determination, updates the position and the velocity of the mobile body in the storage unit;

a mobile body position transmission step that, in the case where the mode of the terminal device corresponds to the parent device, transmits the updated position and the updated velocity of the mobile body to the other terminal devices among the plurality of terminal devices;

a mobile body position reception step that, in the case where the mode of the terminal device corresponds to the child device, receives the position and the velocity of the mobile body, the position and the velocity being transmitted from, among the plurality of terminal devices, a terminal device having the mode corresponding to the parent device; and a child mobile body updating step that updates in the storage unit the received position and the received velocity of the mobile body.

13. A non-transitory computer-readable information recording medium recording a program that instructs a computer to function as any of a plurality of mutually communicable terminal devices possessed by a game system that moves a plurality of operation objects and one mobile body in a virtual space, wherein the program instructs the computer to function as:

a storage unit that stores respective positions and respective velocities of the plurality of operation objects, and a position and a velocity of the mobile body, and stores whether a mode of the terminal device corresponds to a parent device or a child device;

an instruction input reception unit that receives instruction input from a user assigned to the terminal device;

a local position updating unit that updates in the storage unit, on a basis of the received instruction input, a position where an operation object assigned to the user is arranged and a velocity of the operation object among the plurality of operation objects;

a local position transmission unit that transmits the updated position and the updated velocity of the operation object assigned to the user to other terminal devices among the plurality of terminal devices;

an other position reception unit that receives positions and velocities of operation objects assigned to other users, the positions and the velocities being transmitted from the other terminal devices among the plurality of terminal devices;

an other position updating unit that updates in the storage unit the received positions and the received velocities of the operation objects assigned to the other users;

a parent transfer unit that, in a case where the mode of the terminal device corresponds to the parent device, from the respective positions and the respective velocities of the plurality of operation objects, and the position and the velocity of the mobile body, estimates a which operation object will next come into contact with the mobile body, and if a terminal device assigned with a user assigned with the estimated operation object is another terminal device, updates the mode of the terminal device to a mode corresponding to the child device in the storage unit to notify the another terminal device that the another terminal device should serve as the parent device;

a parent serving update unit that, in a case where the mode of the terminal device corrresponds to the child device, if the terminal device is notified from any of the other terminal devices that the terminal device should serve as the parent device, updates the mode of the terminal device to the mode corresponding to the parent device in the storage unit;

a parent mobile body updating unit that, in the case where the mode of the terminal device corresponds to the parent device, from the respective positions and the respective velocities of the plurality of operation objects, and the position and the velocity of the mobile body, determines whether or not the mobile body comes into contact with the plurality of operation objects, and on a basis of a result of the determination, updates the position and the velocity of the mobile body in the storage unit;

a mobile body position transmission unit that, in the case where the mode of the terminal device corresponds to the parent device, transmits the updated position and the updated velocity of the mobile body to the other terminal devices among the plurality of terminal devices;

a mobile body position reception unit that, in the case where the mode of the terminal device corresponds to the child device, receives the position and the velocity of the mobile body, the position and the velocity being transmitted from, among the plurality of terminal devices, a terminal device having the mode corresponding to the parent device; and a child mobile body updating unit that updates in the storage unit the received position and the received velocity of the mobile body.

14. A non-transitory computer-readable information recording medium recording a program that instructs a computer to function as any of a plurality of mutually communicable terminal devices possessed by a game system that moves a plurality of operation objects and one or more mobile body in a virtual space, wherein the program instructs the computer to function as:

- a storage unit that stores respective positions and respective velocities of the plurality of operation objects, and respective positions and respective velocities of the one or more mobile bodies, and stores whether or not the terminal device controls each of the one or more mobile bodies;
- an instruction input reception unit that receives instruction input from a user assigned to the terminal device;
- a local position updating unit that updates in the storage unit, on a basis of the received instruction input, a position where an operation object assigned to the user is arranged and a velocity of the operation object among the plurality of operation objects;
- a local position transmission unit that transmits the updated position and the updated velocity of the operation object assigned to the user to other terminal devices among the plurality of terminal devices;
- an other position reception unit that receives positions and velocities of operation objects assigned to other users, the positions and the velocities being transmitted from the other terminal devices among the plurality of terminal devices;
- an other position updating unit that updates in the storage unit the received positions and the received velocities of the operation objects assigned to the other users;
- a parent transfer unit that, for each of mobile bodies controlled by the terminal device among the one or more mobile bodies, estimates which operation object will next come into contact with the mobile body from the respective positions and the respective velocities of the plurality of operation objects, and a position and a velocity of the mobile body, and if a terminal device assigned with a user assigned with the estimated operation object is another terminal device, makes an update in the storage unit such that the terminal device does not control the mobile body, and notifies the another terminal device that the another terminal device should control the mobile body;
- a parent serving update unit that, if the terminal device is notified from any of the other terminal devices among the plurality of terminal devices that the terminal device should control some mobile body, makes an update in the storage unit such that the terminal device controls the mobile body;
- a parent mobile body updating unit that, for each of the mobile bodies controlled by the terminal device among the one or more mobile bodies, determines whether or not the mobile body comes into contact with the plurality of operation objects or other mobile bodies among the one or more mobile bodies, from the respective positions and the respective velocities of the plurality of operation objects, and a position and a velocity of the mobile body, and on a basis of a result of the determination, updates the position and the velocity of the mobile body in the storage unit;
- a mobile body position transmission unit that, for each of the mobile bodies controlled by the terminal device among the one or more mobile bodies, transmits the updated position and the updated velocity of the mobile body to the other terminal devices among the plurality of terminal devices;
- a mobile body position reception unit that receives a position and a velocity of some mobile body, the position and the velocity being transmitted from any of the other terminal devices among the plurality of terminal devices; and
- a child mobile body updating unit that updates in the storage unit the received position and the received velocity of the mobile body.

\* \* \* \* \*

UNITED STATES PATENT AND TRADEMARK OFFICE
CERTIFICATE OF CORRECTION

PATENT NO. : 8,475,278 B2  
APPLICATION NO. : 12/747871  
DATED : July 2, 2013  
INVENTOR(S) : Shoji Mori Page 1 of 1

It is certified that error appears in the above-identified patent and that said Letters Patent is hereby corrected as shown below:

In the Claims

Column 34, line 22, Claim 13: Please delete the "a" between the words estimates and which.

Signed and Sealed this
Third Day of September, 2013

Teresa Stanek Rea
*Acting Director of the United States Patent and Trademark Office*